(12) United States Patent
Dhau

(10) Patent No.: US 12,697,602 B2
(45) Date of Patent: Aug. 4, 2026

(54) ANTIBIOLOGICAL SORBENT AND METHOD OF MANUFACTURE THEREOF

(71) Applicant: Molekule Group, Inc., Palm Beach, FL (US)

(72) Inventor: Jaspreet S. Dhau, San Francisco, CA (US)

(73) Assignee: Molekule Group, Inc., Palm Beach Gardens, FL (US)

( * ) Notice: Subject to any disclaimer, the term of this patent is extended or adjusted under 35 U.S.C. 154(b) by 481 days.

(21) Appl. No.: 18/230,848

(22) Filed: Aug. 7, 2023

(65) Prior Publication Data

US 2024/0042418 A1     Feb. 8, 2024

Related U.S. Application Data

(60) Provisional application No. 63/395,405, filed on Aug. 5, 2022.

(51) Int. Cl.
B01J 20/32     (2006.01)
B01J 20/02     (2006.01)
(Continued)

(52) U.S. Cl.
CPC ......... B01J 20/324 (2013.01); B01J 20/0259 (2013.01); B01J 20/0262 (2013.01);
(Continued)

(58) Field of Classification Search
CPC .. B01J 20/324; B01J 20/0259; B01J 20/0262; B01J 20/041; B01J 20/20;
(Continued)

(56) References Cited

U.S. PATENT DOCUMENTS 2,311,272  A     2/1943  Ware
4,065,276  A     12/1977  Nakaya et al.
(Continued)

FOREIGN PATENT DOCUMENTS

CN     102794039  A     11/2012
CN     105126836  A     12/2015
(Continued)

OTHER PUBLICATIONS

"3D Carbon", CI, Columbus Industries, Inc. Filtration Groups, first downloaded May 18, 2021.
(Continued)

*Primary Examiner* — Stuart L Hendrickson
(74) *Attorney, Agent, or Firm* — Jeffrey Schox; Randy Mehlenbacher

(57)     ABSTRACT

An antibiological sorbent can include sorbent material (e.g., porous carbon, activated carbon, inorganic carbon, organic carbon, etc.), antibiological material, optionally a functionalizing material, and/or any other suitable material. The antibiological material (and/or the functionalizing material) can coat, intercalate within (e.g., within a porous network of), form structures on, be disposed on, bind to, and/or otherwise be interfaced to the sorbent material. A method for manufacturing the antibiological sorbent can include: mixing sorbent material with a precursor; optionally, functionalizing (e.g., activating) the sorbent material; forming antibiological material from the precursor; optionally, post-processing (e.g., washing) the resulting material; and/or any suitable steps.

10 Claims, 10 Drawing Sheets

(51) Int. Cl.

| | |
|---|---|
| *B01J 20/04* | (2006.01) |
| *B01J 20/20* | (2006.01) |
| *B01J 20/28* | (2006.01) |
| *B82Y 30/00* | (2011.01) |

(52) U.S. Cl.
CPC ............. *B01J 20/041* (2013.01); *B01J 20/20* (2013.01); *B01J 20/28083* (2013.01); *B01J 20/28085* (2013.01); *B01J 2220/42* (2013.01); *B82Y 30/00* (2013.01)

(58) Field of Classification Search
CPC ............ B01J 20/28083; B01J 20/28085; B01J 2220/42; B82Y 30/00
See application file for complete search history.

(56) References Cited

U.S. PATENT DOCUMENTS

| | | | |
|---|---|---|---|
| 4,896,590 | A | 1/1990 | Groos |
| 4,931,654 | A | 6/1990 | Horng |
| D328,946 | S | 8/1992 | Havrilla |
| 5,240,479 | A | 8/1993 | Bachinski |
| D360,635 | S | 7/1995 | Mark |
| D362,441 | S | 9/1995 | Mark |
| 5,453,049 | A | 9/1995 | Tillman et al. |
| 5,505,904 | A | 4/1996 | Haidinger et al. |
| 5,620,669 | A | 4/1997 | Plinke et al. |
| 5,709,735 | A | 1/1998 | Midkiff et al. |
| 5,790,934 | A | 8/1998 | Say et al. |
| D400,663 | S | 11/1998 | Furlough |
| 5,873,920 | A | 2/1999 | Wong et al. |
| 5,922,093 | A | 7/1999 | James et al. |
| 5,933,702 | A | 8/1999 | Goswami |
| 5,997,829 | A | 12/1999 | Sekine et al. |
| 5,998,328 | A | 12/1999 | Dawes et al. |
| 6,010,666 | A | 1/2000 | Kurokawa et al. |
| 6,319,484 | B1 | 11/2001 | Shore et al. |
| 6,372,694 | B1 | 4/2002 | Osinga et al. |
| 6,379,585 | B1 | 4/2002 | Vecht et al. |
| 6,531,100 | B1 | 3/2003 | Ogata et al. |
| 6,607,702 | B1 | 8/2003 | Kang et al. |
| 6,613,277 | B1 | 9/2003 | Monagan |
| D493,874 | S | 8/2004 | Woods |
| D505,999 | S | 6/2005 | Song |
| 6,939,397 | B2 | 9/2005 | Nelsen et al. |
| 7,063,820 | B2 | 6/2006 | Goswami |
| 7,074,369 | B2 | 7/2006 | Tabatabaie-Raissi et al. |
| 7,160,506 | B2 | 1/2007 | Deshpande |
| 7,211,707 | B2 | 5/2007 | Axtell et al. |
| 7,256,156 | B2 | 8/2007 | Axtell et al. |
| D552,724 | S | 10/2007 | Chen |
| 7,291,205 | B2 | 11/2007 | Chu |
| 7,371,351 | B2 | 5/2008 | Goswami |
| 7,378,372 | B2 | 5/2008 | Sylvester |
| 7,566,359 | B2 | 7/2009 | Goel et al. |
| D611,579 | S | 3/2010 | Zlotnik et al. |
| 7,786,033 | B2 | 8/2010 | Marzolin et al. |
| 7,820,100 | B2 | 10/2010 | Garfield et al. |
| 7,910,940 | B2 | 3/2011 | Koike et al. |
| 8,003,058 | B2 | 8/2011 | Bergeron et al. |
| D648,429 | S | 11/2011 | Choi et al. |
| 8,048,391 | B2 | 11/2011 | Molins |
| D652,408 | S | 1/2012 | Chen |
| D687,017 | S | 7/2013 | Ashcraft et al. |
| D697,496 | S | 1/2014 | Ashcraft et al. |
| 8,658,046 | B2 | 2/2014 | Barry et al. |
| 8,664,153 | B1 | 3/2014 | Ahumada |
| 8,691,144 | B2 | 4/2014 | Garfield et al. |
| 8,691,722 | B2 | 4/2014 | Gadkaree et al. |
| 8,709,341 | B2 | 4/2014 | Day et al. |
| D710,329 | S | 8/2014 | Holzer |
| D716,427 | S | 10/2014 | Lim et al. |
| D717,420 | S | 11/2014 | Von Seggern |
| 8,951,376 | B2 | 2/2015 | Rasmussen |
| D744,541 | S | 12/2015 | Langhammer et al. |
| D752,732 | S | 3/2016 | Ansley et al. |
| D754,832 | S | 4/2016 | Seo et al. |
| D766,213 | S | 9/2016 | Hinokio |
| D768,844 | S | 10/2016 | Koseoglu et al. |
| 9,492,775 | B2 | 11/2016 | Amsden et al. |
| D773,704 | S | 12/2016 | Pardo et al. |
| D774,020 | S | 12/2016 | Hinokio |
| 9,527,257 | B2 | 12/2016 | Lipton et al. |
| 9,662,626 | B2 | 5/2017 | Yates et al. |
| D796,019 | S | 8/2017 | Thompson |
| D802,022 | S | 11/2017 | Yao et al. |
| D803,369 | S | 11/2017 | Kim et al. |
| D803,810 | S | 11/2017 | Lee et al. |
| D804,002 | S | 11/2017 | Huang |
| D805,622 | S | 12/2017 | Lee |
| D806,843 | S | 1/2018 | McDonnell |
| D807,327 | S | 1/2018 | Xiong |
| D808,927 | S | 1/2018 | Schaal et al. |
| D810,049 | S | 2/2018 | Lee et al. |
| D810,135 | S | 2/2018 | Langhammer et al. |
| D810,137 | S | 2/2018 | Tsang et al. |
| D810,265 | S | 2/2018 | Chen |
| D810,266 | S | 2/2018 | Li |
| 9,943,796 | B2 | 4/2018 | Ptak et al. |
| D818,097 | S | 5/2018 | Cho et al. |
| 10,039,852 | B2 | 8/2018 | Yi et al. |
| D828,912 | S | 9/2018 | Powell et al. |
| D829,312 | S | 9/2018 | Riering-Czekalla et al. |
| D829,313 | S | 9/2018 | Cho et al. |
| D829,314 | S | 9/2018 | Cho et al. |
| D831,810 | S | 10/2018 | Cho et al. |
| D831,811 | S | 10/2018 | Cho et al. |
| D832,414 | S | 10/2018 | Sharma et al. |
| 10,105,463 | B2 | 10/2018 | Kim et al. |
| D834,694 | S | 11/2018 | Walter et al. |
| 10,137,216 | B2 | 11/2018 | Goswami et al. |
| D835,766 | S | 12/2018 | Chen |
| D836,760 | S | 12/2018 | Fredäng et al. |
| 10,183,187 | B2 | 1/2019 | Li |
| D850,596 | S | 6/2019 | Wu |
| D865,149 | S | 10/2019 | Lin |
| D865,932 | S | 11/2019 | Ha et al. |
| D870,870 | S | 12/2019 | Copparstad et al. |
| 10,517,980 | B2 | 12/2019 | Kim et al. |
| 10,549,268 | B2 | 2/2020 | Ozaki et al. |
| D879,276 | S | 3/2020 | King |
| 10,584,886 | B2 | 3/2020 | Goswami et al. |
| D882,056 | S | 4/2020 | Baillie et al. |
| 10,625,207 | B2 | 4/2020 | Rao et al. |
| D884,138 | S | 5/2020 | Chen |
| D884,860 | S | 5/2020 | Zhang |
| D886,268 | S | 6/2020 | Montagnino et al. |
| D886,272 | S | 6/2020 | Yang et al. |
| D886,975 | S | 6/2020 | Yang et al. |
| D888,919 | S | 6/2020 | Riering-Czekalla et al. |
| D888,923 | S | 6/2020 | Zhong |
| 10,684,027 | B2 | 6/2020 | Goswami et al. |
| D906,501 | S | 12/2020 | Lim |
| D912,793 | S | 3/2021 | Riering-Czekalla et al. |
| D912,795 | S | 3/2021 | Wang et al. |
| 10,981,102 | B2 | 4/2021 | Trent et al. |
| D919,071 | S | 5/2021 | Zheng |
| 11,097,525 | B1 | 8/2021 | Dhau et al. |
| D935,590 | S | 11/2021 | Xu |
| D935,591 | S | 11/2021 | Xu |
| D951,419 | S | 5/2022 | Ha et al. |
| D952,823 | S | 5/2022 | Wu |
| 11,529,623 | B2 | 12/2022 | Ozaki et al. |
| 11,596,900 | B2 | 3/2023 | Dhau et al. |
| 2002/0160913 | A1 | 10/2002 | Sangiovanni et al. |
| 2003/0180200 | A1 | 9/2003 | Reisfeld |
| 2004/0007000 | A1 | 1/2004 | Takeda et al. |
| 2004/0013583 | A1 | 1/2004 | Burkhardt |
| 2004/0146437 | A1 | 7/2004 | Arts et al. |
| 2004/0166037 | A1 | 8/2004 | Youdell et al. |
| 2004/0262217 | A1 | 12/2004 | Mori et al. |
| 2005/0061656 | A1 | 3/2005 | Benoit et al. |
| 2005/0129591 | A1 | 6/2005 | Wei et al. |
| 2005/0132682 | A1 | 6/2005 | Paul |

(56) References Cited

U.S. PATENT DOCUMENTS

| | | |
|---|---|---|
| 2005/0138905 A1 | 6/2005 | Kubokawa |
| 2005/0193696 A1 | 9/2005 | Muller et al. |
| 2005/0201907 A1 | 9/2005 | Wakamura |
| 2006/0057020 A1 | 3/2006 | Tufo |
| 2006/0124442 A1 | 6/2006 | Valpey et al. |
| 2006/0150818 A1 | 7/2006 | Okamoto et al. |
| 2007/0034801 A1 | 2/2007 | Yokoi et al. |
| 2007/0041882 A1 | 2/2007 | Roseberry et al. |
| 2007/0059225 A1 | 3/2007 | Willette |
| 2007/0163588 A1 | 7/2007 | Hebrank et al. |
| 2007/0199288 A1 | 8/2007 | Paterson et al. |
| 2007/0253860 A1 | 11/2007 | Schroder |
| 2007/0289270 A1 | 12/2007 | Schumann et al. |
| 2007/0296035 A1 | 12/2007 | George et al. |
| 2008/0050288 A1 | 2/2008 | Okamoto et al. |
| 2008/0112845 A1 | 5/2008 | Dunn et al. |
| 2009/0002985 A1 | 1/2009 | Peck et al. |
| 2009/0010801 A1 | 1/2009 | Murphy et al. |
| 2009/0032390 A1 | 2/2009 | Osterlund |
| 2009/0041632 A1 | 2/2009 | Day et al. |
| 2009/0175757 A1 | 7/2009 | Yao et al. |
| 2009/0229478 A1 | 9/2009 | Wu |
| 2009/0245594 A1 | 10/2009 | Abramovich et al. |
| 2010/0003164 A1 | 1/2010 | Bourne et al. |
| 2010/0101413 A1 | 4/2010 | Jones et al. |
| 2010/0143205 A1 | 6/2010 | Engelhard |
| 2010/0196222 A1 | 8/2010 | Kosugi et al. |
| 2010/0196223 A1 | 8/2010 | Hay et al. |
| 2010/0260644 A1 | 10/2010 | Day et al. |
| 2010/0303678 A1 | 12/2010 | Lockhart et al. |
| 2011/0088375 A1 | 4/2011 | Suzuki et al. |
| 2011/0101712 A1 | 5/2011 | Laconte |
| 2011/0117002 A1 | 5/2011 | Dardas et al. |
| 2011/0203238 A1 | 8/2011 | Witter et al. |
| 2011/0297616 A1* | 12/2011 | Hughes ............... B01J 20/0262 |
| | | 210/660 |
| 2012/0077668 A1 | 3/2012 | Takada et al. |
| 2012/0161405 A1 | 6/2012 | Mohn et al. |
| 2012/0183443 A1 | 7/2012 | Hurley |
| 2012/0199005 A1 | 8/2012 | Koji et al. |
| 2012/0273340 A1 | 11/2012 | Felix |
| 2012/0301363 A1 | 11/2012 | Kim et al. |
| 2013/0036908 A1 | 2/2013 | Jones et al. |
| 2013/0294968 A1 | 11/2013 | Owen et al. |
| 2014/0107371 A1* | 4/2014 | Bakker ............... B01J 37/0018 |
| | | 558/414 |
| 2014/0131923 A1 | 5/2014 | Festner et al. |
| 2014/0271419 A1 | 9/2014 | Tsotsis et al. |
| 2014/0290489 A1 | 10/2014 | Uemura et al. |
| 2015/0008014 A1 | 1/2015 | Zhou et al. |
| 2015/0125355 A1 | 5/2015 | Lee et al. |
| 2015/0306271 A1 | 10/2015 | Willette |
| 2015/0320900 A1 | 11/2015 | Goswami et al. |
| 2015/0375187 A1 | 12/2015 | Yates et al. |
| 2016/0129432 A1 | 5/2016 | Ozaki et al. |
| 2016/0279556 A1 | 9/2016 | Law |
| 2016/0367916 A1 | 12/2016 | Koehler |
| 2017/0043044 A1 | 2/2017 | Sobhy |
| 2017/0106218 A1 | 4/2017 | Lin et al. |
| 2017/0122605 A1 | 5/2017 | Lee et al. |
| 2017/0273845 A1 | 9/2017 | Phillips et al. |
| 2017/0321717 A1 | 11/2017 | Park et al. |
| 2018/0001312 A1 | 1/2018 | Shibai et al. |
| 2018/0027809 A1 | 2/2018 | Chiattello et al. |
| 2018/0104374 A1 | 4/2018 | Kim et al. |
| 2018/0117511 A1 | 5/2018 | Yamauchi et al. |
| 2018/0169551 A1 | 6/2018 | Jaganathan et al. |
| 2018/0221856 A1 | 8/2018 | Li et al. |
| 2018/0344890 A1 | 12/2018 | Watanabe et al. |
| 2019/0063763 A1 | 2/2019 | Kleinberger et al. |
| 2019/0083930 A1 | 3/2019 | Bernardoni et al. |
| 2019/0113246 A1 | 4/2019 | Goswami et al. |
| 2019/0120508 A1 | 4/2019 | Goswami et al. |
| 2019/0314751 A1 | 10/2019 | Cheng et al. |
| 2020/0030731 A1 | 1/2020 | Dhau et al. |
| 2020/0061635 A1 | 2/2020 | Wiser et al. |
| 2020/0109869 A1 | 4/2020 | Mäkipää et al. |
| 2020/0129972 A1 | 4/2020 | Ozaki et al. |
| 2020/0182495 A1 | 6/2020 | Park et al. |
| 2020/0224892 A1 | 7/2020 | Yang et al. |
| 2020/0360858 A1 | 11/2020 | Mathur et al. |
| 2021/0046417 A1 | 2/2021 | Gaur et al. |
| 2021/0222897 A1 | 7/2021 | Sanabria et al. |
| 2022/0062822 A1 | 3/2022 | Dhau et al. |
| 2024/0042418 A1 | 2/2024 | Dhau et al. |

FOREIGN PATENT DOCUMENTS

| | | |
|---|---|---|
| CN | 107096320 A | 8/2017 |
| CN | 107344043 A | 11/2017 |
| CN | 304684615 | 6/2018 |
| CN | 305656141 | 3/2020 |
| IN | 2993800001 | 11/2017 |
| JP | H0568820 A | 3/1993 |
| JP | 10-085558 A | 4/1998 |
| JP | H11505746 A | 5/1999 |
| JP | H11188085 A | 7/1999 |
| JP | 2001025668 A | 1/2001 |
| JP | 2001029441 A | 2/2001 |
| JP | 2001232154 A | 8/2001 |
| JP | 2002263175 A | 9/2002 |
| JP | 2002291856 A | 10/2002 |
| JP | 2003062414 A | 3/2003 |
| JP | 2003070885 A | 3/2003 |
| JP | 2007190533 A | 8/2007 |
| JP | 2008522822 A | 7/2008 |
| JP | 2016084946 A | 5/2016 |
| JP | 2016530908 A | 10/2016 |
| JP | 2017148484 A | 8/2017 |
| JP | 2022070983 A | 5/2022 |
| KR | 19990021845 A | 3/1999 |
| KR | 20130125190 A | 11/2013 |
| KR | 20180057394 A | 5/2018 |
| KR | 101977573 B1 | 5/2019 |
| WO | 9637281 A1 | 11/1996 |
| WO | 2004078320 A1 | 9/2004 |
| WO | 2006065491 A2 | 6/2006 |
| WO | 2015002324 A1 | 1/2015 |
| WO | 2015098386 A1 | 7/2015 |

OTHER PUBLICATIONS

"Molecular Filtration, Filters Specializing in the removal of VOCs and Odors", CI Columbus Industries, Inc. Filtration Group, first downloaded May 18, 2021.

"Molekule Air Pro FDA-Cleared Medical Air Purifier", First available Sep. 17, 2020[online], [site visited Dec. 14, 2021]. Available from u internet, https ://www.amazon.ca/Molekule-Technology-Allergens-Pollutants-Professional/dp/B08J9J396 N > (Year: 2020).

"Molekule Air Purifier", found online—[Feb. 22, 2018]—https:// molekule.com/?utm_ source=google_ search_s earch&utm_medium= rt&utm_ campaign=brand&utm_ term=term=molekule&utm_content= bmm_2&gclid= EAaIQobChMI5ufdtbK62QIViYjICh3d8gvEAYAA SAAEgJcdPD_ BwE.

"Molekule Website Screen Capture", from Jun. 10, 2016 by Wayback Machine, (Year: 2016).

"Molekule website screen grabs", from Wayback Machine Internet Archive. Jun. 10, 2016 (Year: 2016).

"Water-Based Adhesives-Information and Overview", https://www. hotmelt.com/blogs/blog/water-based-adhesives-information-and-overview, first downloaded Jan. 28, 2020.

Bisht, Neha , et al., "Selenium nanoparticles: a review on synthesis and biomedical applications", Mater. Adv., 2022, 3, 1415.

Cao, Jinshan , et al., "Patterned nanofiber air filters with high optical transparency, robust mechanical strength, and effective PM2.5 capture capability", RSC Adv., 2020, 10, 20155.

Curtis, Gannon L., et al., "Reduction of Total and Viable Air Particles in the OR Setting by using Ultraviolet In-room Air Disinfection and Recirculation Units", American Association of Hip and Knee Surgeons, Cleveland Clinic, Nov. 4, 2017.

(56)　　　　　References Cited

OTHER PUBLICATIONS

Darlrymple, Omatoyo K., et al., "A review of the mechanisms and modeling of photocatalytic disinfection", Applied Catalysis B.: Environmental 98 (2010) 27-38.

Evans, Hugh , "Adhesives: Understanding adhesives for filter fabrication", Filter Media Apr. 26, 2012, https://www.filtsep.com/filter%20media/features/adhesives-understanding-adhesives-for-filter/.

Guo, Yanzhen , et al., "Au nanoparticle-embedded, nitrogen-deficient hollow mesoporous carbon nitride spheres for nitrogen photofixation", J. Mater. Chem. A, 2020, 8, 16218.

Henning, Laura M., et al., "Review on Polymeric, Inorganic, and Composite Materials for Air Filters: From Processing to Properties", DOI: 10.1002/aesr.202100005 Adv. Energy Sustainability Res. 2021, 2, 2100005.

Hou, Wenbo , et al., A review of surface plasmon resonance-enhanced photocatalysis, Advanced 4, 15 Functional Materials 23.13 (Apr. 5, 2013): 1612-1619. p. 1 col. 2 para 1, p. 2 col. 1 para 2.

Huang, Toa , et al., "Engineering highly effective antimicrobial selenium nanoparticles through control of particle size", Nanoscale, Aug. 8, 2019;11(31):14937-14951. doi: 10.1039/c9nr04424h.

Larzelere, John , "New and Novel Technologies in Particulate Filtration", https://apps.dtic.mil/sti/pdfs/ADA444770.pdf, 2006.

Liu, Chong , et al., "Transparent air filter for high-efficiency PM2.5 capture", Nature Communications, 6:6205, DOI: 10.1038/ncomms7205, published Feb. 16, 2015.

Marzocchi, Alfred , et al., "Glass Fibers and Their Use as Filter Media", Journal of the Air Pollution Association, Mar. 19, 2012.

Merrill, Reynold C., et al., "Chemistry of the soluble silicates", J. Chem. Educ. 1947, 24, 6, 262, Jun. 1, 1947, https://pubs.acs.org/doi/pdf/10.1021/ed024p262.

Neves, Ana I.S., et al., "Towards conductive textiles: coating polymeric fibers with graphene", Nature, Scientific Reports 7: 4250, Mar. 7, 2017.

Ochiai, Tsuyoshi , et al., Photoelectrochemical properties ofTiO2 photocatalyst and its applications for environmental purification, Journal of Photochemistry and Photobiology C: Photochemistry reviews 13.4 (Dec. 1, 2012): 247-262.

Samburova, Vera , et al., "Dominant volatile organic compounds (VOCs) measured at four Cannabis growing facilities: Pilot study results", Journal of the Air & Waste Management Association, Sep. 9, 2019.

Song, Yoodae , et al., "Systematic study on preparation of copper nanoparticle embedded porous carbon by carbonization of metal-organic framework for enzymatic glucose sensor", RSC Adv., 2017, 7, 10592.

Vahdati, Mahsa , et al., "Synthesis and characterization of Selenium nanoparticles—Lysozyme nanohybrid System with Synergistic Anti-bacterial properties", Nature, Scientific Reports (2020) 10:510, https://doi.org/10.1038/s41598-019-57333-7.

Wertz, John , et al., "Filtration media: Advantages of nanofibre coating technology", Filtration Seperation, Sep. 7, 2009.

* cited by examiner

100

400        300

200        10

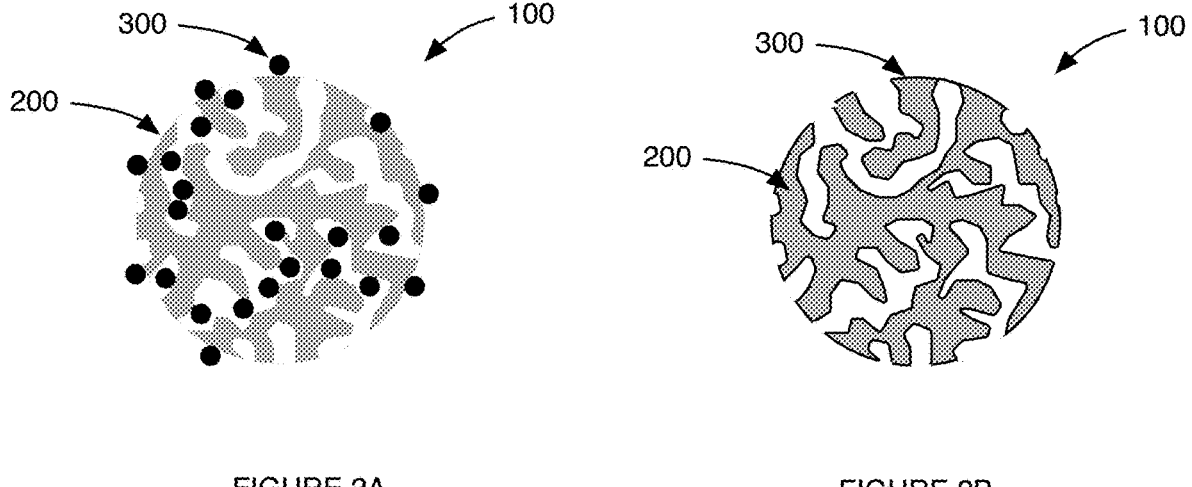
FIGURE 2A                    FIGURE 2B
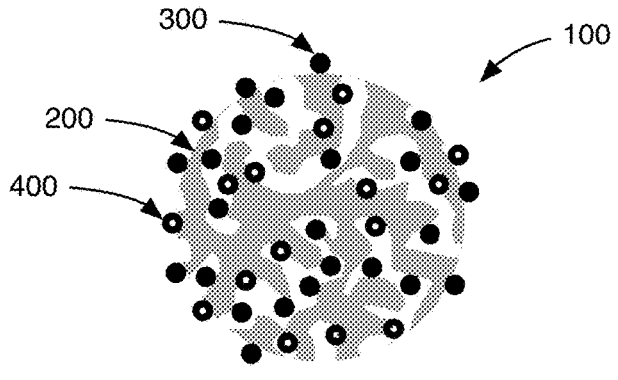
FIGURE 2C 4 hours 24 hours 10μm 10μm

| Observations | Untreated carbon material | Treated carbon material |
|---|---|---|
| Weight of carbon particles | 21.5 gm | 21.5 gm |
| Total volume injected | 8.5 mL | 8.5 mL |
| Total weight gain | 5.2 gm (6 mL) | 5 gm (5.8 mL) |
| Results | 100 % | 97% |
FIGURE 10
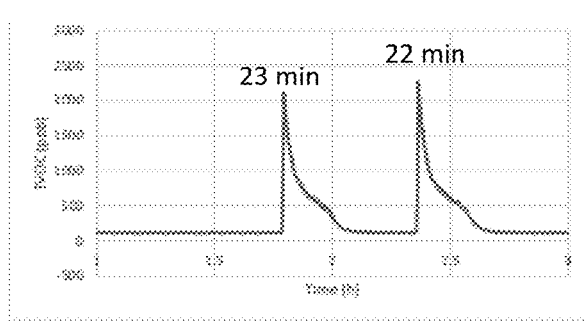
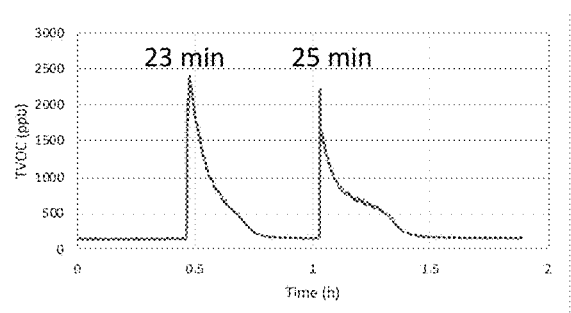
FIGURE 11A                    FIGURE 11B

ANTIBIOLOGICAL SORBENT AND METHOD OF MANUFACTURE THEREOF

CROSS-REFERENCE TO RELATED APPLICATIONS

This application claims the benefit of U.S. Provisional Application No. 63/395,405 filed 5 Aug. 2022, which is incorporated in its entirety by this reference.

TECHNICAL FIELD

This invention relates generally to the fluid filtration field, and more specifically to a new and useful system and method in the fluid filtration field.

BRIEF DESCRIPTION OF THE FIGURES

FIGS. 2A, 2B, and 2C are schematic representations of examples of porous sorbent material (e.g., activated carbon) loaded with antibiological material (and/or functionalizing material).

FIG. 10 is an example of volatile organic compound (VOC such as test VOCs like limonene, toluene, acetone, etc.) sorption performance for untreated (e.g., excluding antibiological material) and treated (e.g., including antibiological material) carbon material.

FIGS. 11A and 11B are examples of volatile organic compound (VOC such as test VOCs like limonene, toluene, acetone, etc.) sorption kinetics for untreated (e.g., excluding antibiological material) and treated (e.g., including antibiological material) carbon material, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
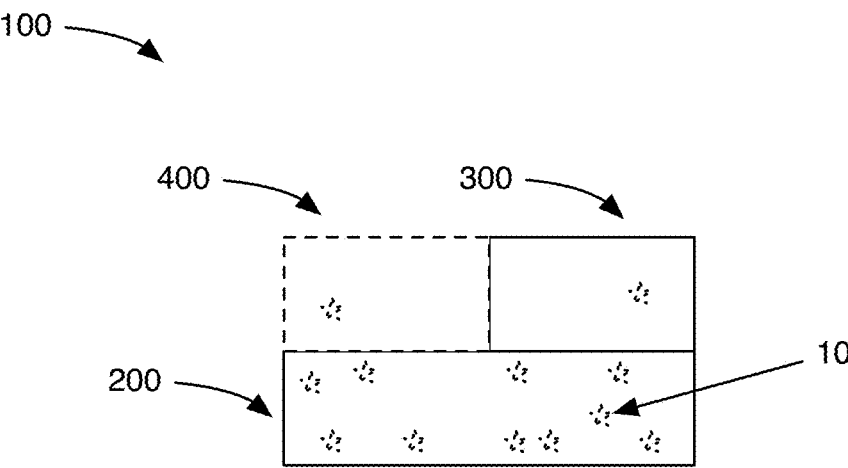
FIG. 1 is a schematic representation of an example of an antibiological sorbent material.

As shown for instance in FIG. 1, the system 100 can include sorbent material 200 (e.g., porous carbon, activated carbon, inorganic carbon, organic carbon, etc.), antibiological material 300, optionally a functionalizing material 400, and/or any other suitable material (e.g., a substrate or other surface where the sorbent material is in contact with, dispersed on, disposed on, deposited on, etc. the substrate or other surface). As shown for example in FIG. 2A, FIG. 2B, and FIG. 2C, the antibiological material (and/or the functionalizing material) can coat, intercalate within (e.g., within a porous network of), form structures on, be dispersed (e.g., disposed, deposited, etc.) on, bind to, and/or otherwise be interfaced to the sorbent material.

Figure 3:
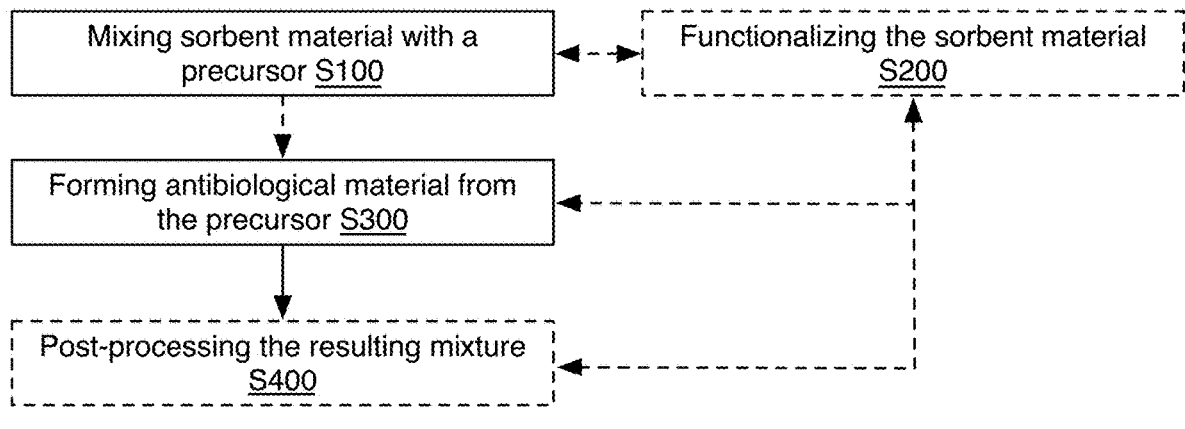
FIG. 3 is a schematic representation of an example of manufacturing a sorbent material loaded with antibiological material.

As shown for example in FIG. 3, a method for manufacturing antibiological particles can include: mixing sorbent material with a precursor S100; optionally, functionalizing (e.g., activating) the sorbent material S200; forming antibiological material from the precursor S300; optionally, post-processing (e.g., washing) the resulting material S400; and/or any suitable steps.

Figure 5A:
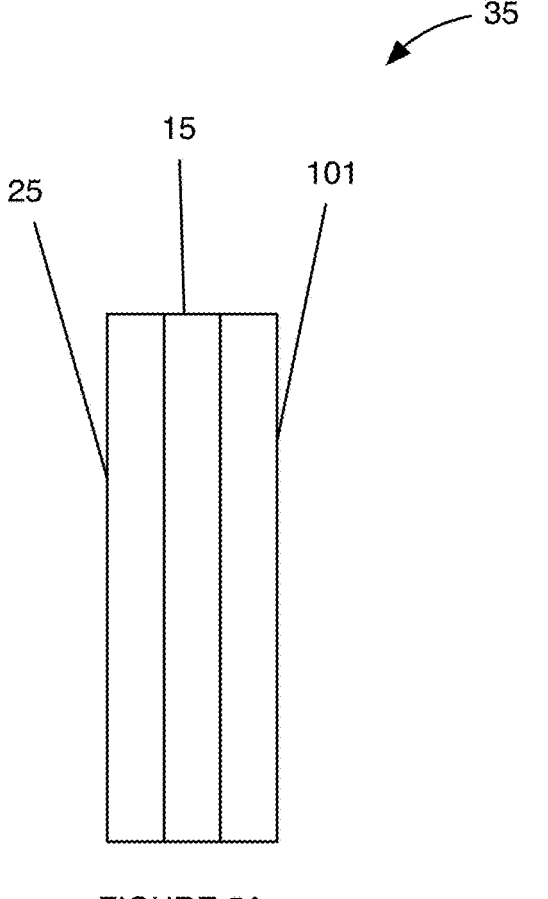
FIGS. 5A and 5B are schematic representations of exemplary filters that include antibiological sorbent.
Figure 5B:
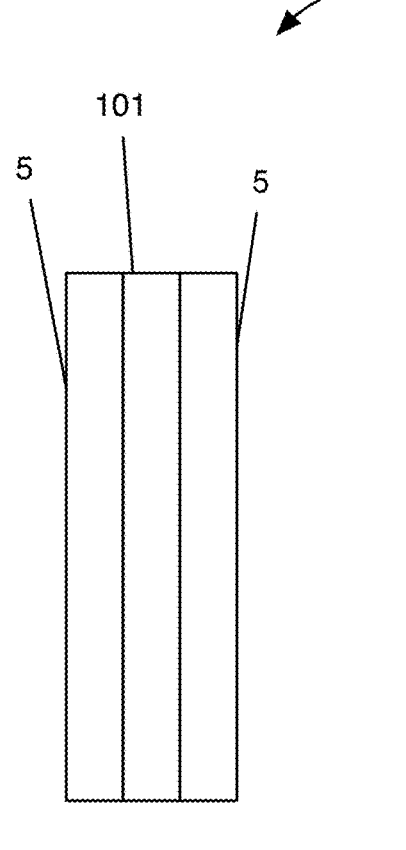

In variants, the system 100 can be and/or include an antibiological sorbent 101. Embodiments of the antibiological sorbent (and/or other antibiological sorbent materials) can be used with (e.g., disposed on) a filter (e.g., an air filter, a water filter, a fluid filter, a prefilter, etc.), disposed on a surface (e.g., a substrate), independently formed, and/or otherwise used. Embodiments of the antibiological sorbent can used in medical settings, offices, HVAC systems, restaurants, hotels, pharmaceutical settings, residences, and/or any other suitable setting. In these embodiments, the antibiological sorbent can function to sorb (e.g., absorb and/or adsorb reversibly and/or irreversibly) contaminants (particularly but not exclusively volatile organic compounds) and/or to deactivate (e.g., kill, capture, destroy, render harmless, prevent from reproducing, etc.) biological species (e.g., bacteria, fungi, viruses, mold, mildew, microbes, etc.). However, the antibiological sorbent can otherwise function. The antibiological sorbent can be integrated into a filter 35, for example: into a single layer filter (e.g., disposed on a substrate, disposed on a scrim, disposed between a pair of scrims 5, as shown for example in FIG. 5B, etc.) and/or into a multilayer filter (e.g., a filter including one or more layer as disclosed in U.S. patent application Ser. No. 16/523,928 titled 'FLUID FILTRATION SYSTEM AND METHOD OF USE' filed on 26 Jul. 2019 which is incorporated in its entirety by this reference such as a reactive layer, a photocatalytic layer 25, a chemical layer, a particle trapping layer, a support layer 15, a sorbent layer, an electrostatic layer, a substrate, etc.; as shown for example in FIG. 5A; etc.). The antibiological sorbent can be attached to the filter and/or a layer or substrate thereof using a retention mechanism such as a physically retained using mechanical force, chemically retained such as using an adhesive or binder, electrostatically retained, and/or other suitable retention mechanism. In some examples, the antibiological sorbent, a filter layer that includes the antibiological sorbent, substrates that cooperatively support the antibiological sorbent, and/or any suitable components can be coupled using an inorganic adhesive as disclosed in U.S. patent application Ser. No. 17/166,931 titled 'FILTER MEDIA AND SYSTEM AND METHOD FOR MANUFACTURE THEREOF' and filed on 3 Feb. 2021, which is incorporated in its entirety by this reference. However, the components can be attached using an organic adhesive, a physical mechanism (e.g., copleating, sandwiching between layers, etc.), and/or in any suitable manner.

However, the antibiological sorbent can be integrated into any suitable application(s).

2. Benefits

Variations of the technology can confer several benefits and/or advantages.

First, variants of the technology can enable filters (or other surfaces) that are in contact with (e.g., loaded with) biological species (e.g., microbe, bacteria, viruses, fungi, etc.) to deactivate (e.g., kill, destroy, hinder or prevent reproduction of, etc.) the biological species. In the absence of the antibiological material, the biological species can proliferate, grow, and potentially thrive, despite being removed from circulation within the environment (proximal the surface such as a room when the surface is a filter). These biological species may release from the surface, produce and release toxins, evolve, and/or otherwise lead to harmful or undesirable effects. The inclusion of antibiological (e.g., antimicrobial) material can deactivate the biological species thereby limiting the extent to which these harmful or undesirable effects occur.

Second, variants of the technology can enable faster and/or more complete deactivation of biological species (e.g., relative to a rate of biological species deactivation in the absence of the antibiological material). For instance, on an air filter (e.g., operating within an air filtration unit) that includes carbon (e.g., activated carbon) without antibiological material, biological species can undergo a 4 log reduction in 72-96 hours (e.g., due to desiccation of the biological species). In a comparable air filter (e.g., operated using a comparable air filtration unit) where the carbon includes antibiological material, the same biological species can undergo a 4 log reduction in less than or equal to 24 hours. However, the biological species can be reduced by any suitable amount and/or at any suitable rate. In examples, the antibiological sorbent can enable faster and/or more complete deactivation of biological species relative to a rate of biological species deactivation for a carbon treated with a conventional surface treatment (and/or using an untreated carbon), as the inventors have discovered that applying antibiological material to both exterior surfaces and the inner pores of the sorbent material (e.g., carbon) can enable the antibiological sorbent to more effectively deactivate biological species (e.g., by increasing a surface area for biological species deactivation, as compared to applying the material only on an exterior surface, etc.).

Third, the inventors have discovered that in examples forming nanoparticles of antibiological material directly on the surface of the sorbent material can eliminate and/or reduce the use of capping agents (e.g., to form the nanoparticles) and/or binding agents (e.g., to adhere the nanoparticles to the sorbent material). Typically, a capping agent is considered necessary to control nanoparticle growth (e.g., achieve a target size, shape, etc.), otherwise the nanoparticles aggregate and/or grow together. However, the inventors have discovered that the capping agent is not required in some examples, as particle growth can be controlled by local concentrations of particle precursors, by performing the nucleation and/or growth in confined spaces (e.g., within a pore volume), and/or can otherwise be controlled without using a capping agent (which may be undesirably sorbed by the sorbent material). Having nanoparticles not encapsulated by a capping agent can result in a greater quantity of potential binding sites, which can confer the benefits of: an increased capacity of the antibiological sorbent to deactivate biological species, an increased bond strength between the nanoparticles and the sorbent material, and/or other suitable benefits. Forming the nanoparticles without the use of a capping agent can additionally or alternatively confer the benefit of eliminating or shortening a step of rejuvenating (e.g., by heating, etc.) the sorbent material (e.g., after S300, during S400, etc.) in the case that the organic material saturates the sorbent material (e.g., carbon).

In examples, adhering (e.g., by forming directly on) the nanoparticles to the sorbent material without the use of a binder can additionally result in higher strength bonds and/or reduce the presence of organic material within the system (e.g., and thereby reduce the amount of organic material sorbed by the sorbent material during the formation of the antibiological sorbent). Forming the nanoparticles on the directly on the sorbent material (e.g., as opposed to separately from the sorbent material) can additionally enable the method to produce smaller nanoparticles (e.g., resulting from local ion concentrations, resulting from nucleation and/or growth of the particles within confined pores of the sorbent material, etc.), which in turn can confer the benefit of providing more binding sites for biological species (e.g., because the nanoparticle can reach smaller pores of the sorbent material, because the smaller nanoparticles themselves have more binding sites, etc.), and thus further increase a capacity of the antibiological sorbent to deactivate biological species.

Fourth, the inventors have discovered that the inclusion of antibiological material on the sorbent material (e.g., carbon) does not significantly impact the sorptive properties of the sorbent material. Typically, one would expect that inclusion of material to block or clog pores, active sites, and/or other locations where molecules can be sorbed by the sorbent material. The inventors have discovered that based on the choice of and manufacture of the antibiological material and antibiological material properties (e.g., particle size, particle morphology, particle surface area, etc.) on the sorbent material, the antibiological sorbent (i.e., carbon that includes antibiological material) can retain a sorption capacity (e.g., volumetric capacity, weight capacity, stoichiometric capacity, VOC sorption capacity, VOC absorption capacity, adsorption capacity, etc.) for molecules (e.g., VOCs, solvents, solutes, etc.) that is at least 80% (e.g., 81%, 82%, 85%, 90%, 92.5%, 95%, 97%, 99%, 99.5%, 99.9%, 100%, etc.) of the sorption capacity for the sorbent material without the antibiological material (e.g., a sorption capacity of the antibiological sorbent is substantially the same as the sorption capacity of the constituent sorbent material). In a specific example shown in FIG. 10, the antibiological sorbent (e.g., a treated carbon material) retains a sorption capacity of 97% of an untreated sorbent (e.g., untreated carbon material), demonstrated by a weight gain under exposure to VOCs within 97% of the weight gain of the untreated sorbent under exposure to VOCs. In some variations, the sorption capacity of (e.g., for particular molecular species, averaged capacity, capacity for any sorbable molecules, etc.) the antibiological sorbent can even be greater than (e.g., 101%, 102%, 105%, 110%, 120%, 150%, 200%, values therebetween etc.) the sorption capacity of the sorbent material with antibiological material (e.g., because the antibiological material can sorb materials, increase a surface area of the material, selectively sorb species, etc.). In some variants, the antibiological sorbent can include activated carbon, where the activated carbon can retain (or exceed) a sorption capacity for VOCs of an activated carbon without the antibiological material (and/or can retain the function of the activated carbon such as to catalyze VOC degradation). However, the sorption capacity of the antibiological sorbent may be less than 80% of the sorption capacity of the sorbent material without the antibiological material. In some variations, the antibiological material can itself provide or have sorptive properties. In some variants, the antibiological coating does not impact the kinetics of the adsorption on the coated sorbent materials (e.g., the rate of adsorption of VOCs and other gases on the coated sorbent materials can be comparable to the rate of adsorption on the uncoated sorbent materials, example shown in FIG. 11A and FIG. 11B).

Fifth, variants of the method for manufacturing antibiological sorbent can include "green chemistry" processes and/or can optimize a number of steps in the manufacture process. In examples, reducing agents used to reduce the precursor for the antibiological material can produce water and/or gaseous byproducts (e.g., entirely gaseous byproducts, almost entirely gaseous byproducts, inert byproducts, etc.) at standard temperature and pressure and/or evaporable byproducts, which can reduce or eliminate the need for post-processing (e.g., washing, heating, drying, etc.) and/or can minimize a contamination of the sorbent material (e.g., deposition of byproducts on the carbon). In further examples, the method for manufacturing antibiological sorbent can integrate directly with methods for manufacturing activated carbon. A carbon can be produced, with concurrent and/or simultaneous steps to make the carbon both antibiological and activated.

Sixth, variants of the technology can enable deactivation of biological species and sorption of molecular species without requiring activation (e.g., activation by light, heat, input energy, etc. such as without using a photocatalytic material).

Seventh, variants of the technology can be produced at a relatively low cost (e.g., as compared to other fluid filtration materials) based on efficient manufacturing processes and/or relatively inexpensive material choices.

However, variants of the technology can confer any other suitable benefits and/or advantages.

3. Illustrative Example

In a first illustrative example the system 100 includes sorbent material 200 an antibiological material 300, and a functionalizing material 400. The sorbent material 200 includes a plurality of porous carbon particles. The antibiological material 300 includes nanoparticles of selenium and/or of copper oxide, and the functionalizing material 400 includes manganese oxide particles (e.g., that are configured to impart chemisorption of VOCs to catalyze degradation of VOCs, etc.). The antibiological material and the functionalizing material are dispersed on all environment facing surfaces of the carbon (e.g., including exterior surfaces and the surfaces of interior pores). The system 100 can include a ratio of about 1:100 of nanoparticles to carbon (e.g., by weight, by volume, by particle count, by elemental composition, by stoichiometry, etc.), a ratio of about 1:5 copper oxide (e.g., $Cu_xO$, $CuO$, $Cu_2O$, etc.) to selenium (e.g., by weight, by mole ratio, by volume, etc.), and about 0.5% to 5% of manganese oxide (e.g., by weight, by mole ratio, by stoichiometry, etc.).

Figure 12A:
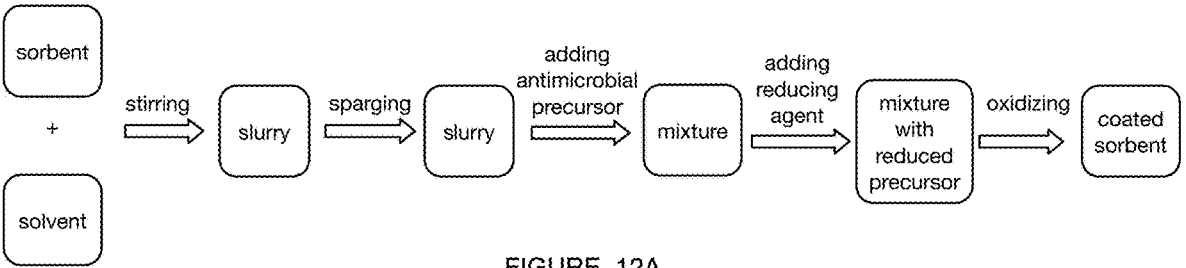
FIGS. 12A, 12B, and 12C are schematic representations of examples of the method.

In a second illustrative example, shown in FIG. 12A, a method for manufacturing antibiological sorbent can include: mixing sorbent material (e.g., a plurality of porous carbon particles) with a solvent (e.g., water) and an antibiological precursor (e.g., selenium powder and/or copper nitrate) to form a mixture (e.g., a slurry, an aqueous solution, etc.); mixing the sorbent material with a functionalizing material (e.g., manganese oxide particles, a solvent-soluble manganese precursor such as manganese nitrate, etc.) to activate the sorbent material before, after, or during mixing with the antibiological precursor; optionally sparging the mixture (e.g., with an inert gas such as nitrogen, helium, neon, argon, krypton, xenon, carbon dioxide, etc.) to create an inert atmosphere (e.g., before, after, or during mixing the sorbent material with the precursor and/or with the functionalizing material) and/or remove oxygen or other reactive gases dissolved within the solvent; adding a reducing agent (e.g., hydrazine hydrate) to the mixture; and oxidizing the mixture to form the antibiological sorbent.

The method can be performed to produce the antibiological sorbent as described above and/or any other suitable material.

4. Antibiological Sorbent

The antibiological sorbent 100 can function to neutralize contaminants, which can include sorbing molecular species and/or deactivating biological species within an environment. The antibiological sorbent (e.g., antimicrobial sorbent, antiviral sorbent, antibiological carbon, antimicrobial carbon, etc.) preferably functions without activation (e.g., without input energy, in the absence of light, without additional heat, via the Oligodynamic effect, etc.), but can additionally or alternatively utilize activation (e.g., input energy, electricity, mechanical energy, heat, light, etc.) to sorb molecular species and/or deactivate biological species (e.g., faster, more completely, etc.). Contaminants 10 can include molecular species and/or biological species. Examples of sorbed species include volatile organic compounds (VOCs such as benzene, ethylene glycol, formaldehyde, methylene chloride, tetrachloroethylene, toluene, xylene, 1,3-butadiene, propane, butane, chloromethane, bromomethane, iodomethane, dichloropropane, vinyl chloride, carbon tetrachloride, acetone, isopropyl alcohol, hexanal, carbon disulfide, polychlorinated biphenyls, benzyl alcohol, chlordane, phthalates, terpenes, limonene, butanal, dichlorobenzene, ethanol, isopentane, isohexane, methanol, acetaldehyde, pentachlorophenol, benzo(a)pyrene, lindane, diazinon, zearalenone, aldicarb, aflatoxin, 2,4-Dinitrophenol, etc.), solvents (e.g., organic solvents such as alcohols, aldehydes, ethers, esters, aromatic compounds, etc.; inorganic solvents and gases such as ammonia, $NO_x$ and $SO_x$ or water; etc.), and other molecules. Examples of biological species include: bacteria, fungi, viruses, mold, mildew, biofilms (e.g., produced by a biological species), and/or any suitable biological species. Deactivating the biological species can include: killing, degrading, destroying, hindering or preventing reproduction, causing the species to enter a dormant state, and/or otherwise deactivating the biological species.

Figures 7A, 7B:
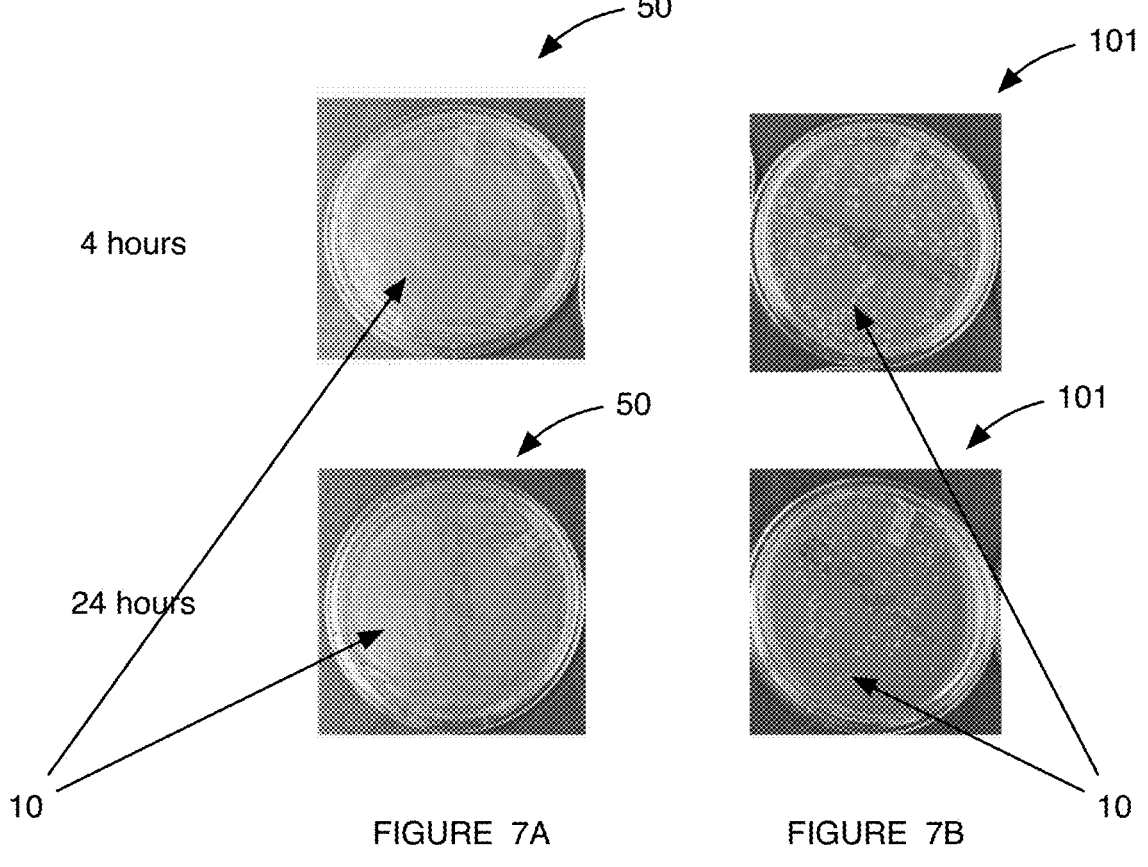
FIGS. 7A and 7B include pictures of culture plates showing bacterial growth in exemplary conditions for a control (e.g., without antibiological sorbent) and an experiment (e.g., including antibiological sorbent), respectively.

The antibiological sorbent preferably exhibits antibiological properties (e.g., antimicrobial properties), including a rate of biological species deactivation, a completeness of biological species deactivation, and/or any other suitable antibiological properties. The antibiological sorbent preferably deactivates the biological species fast for example achieving a target log reduction in activity of the biological species (e.g., as measured based on culturing experiments, as shown for example in FIG. 7A and FIG. 7B, etc.) within a target amount of time. In the example shown in FIG. 7A, a biological film 10 grows over the surface of a control material 50, whereas in the example shown in FIG. 7B, only scattered biological colonies 10 grow on the antibiological sorbent. A capacity of the antibiological sorbent to deactivate biological species can include a reduction in activity time. The target reduction in activity is preferably at least a 1 log reduction (e.g., 2, 2.5, 3, 4, 5, 6, 7, 10, values therebetween, etc. log reduction) in the amount biological species. However, the antibiological sorbent can exhibit less than a 1 log reduction or greater than a 10 log reduction in activity. The target time is preferably less than 24 hours (e.g., 15 minutes, 30 minutes, 1 hour, 2 hours, 4 hours, 6 hours, 8 hours, 12 hours, i8 hours, 24 hours, etc.), but can be greater than 24 hours (e.g., 36 hours, 48 hours, 72 hours, 96 hours, etc.). However, the antibiological sorbent can deactivate the biological species slowly, and/or achieve any suitable reduction in biological activity in any suitable amount of time. The antibiological sorbent preferably deactivates the biological species completely, wherein the antibiological sorbent deactivates close to 100% (e.g., 100%, greater than 99.9%, greater than 99.5%, greater than 99%, greater than 98%, greater than 97%, greater than 95%, etc.) of biological species exposed to the antibiological sorbent. However, the antibiological sorbent can alternatively partially deactivate the biological species (e.g., less than 50%, between 50%-100%, between 60%-100%, between 70%-100%, between 80%-100%, between 90%-100%, etc.).

In examples, the antibiological sorbent can sorb molecular species and/or deactivate biological species from air, surfaces, fluids, and/or any other suitable environment and/or medium. The antibiological sorbent is typically applied to a surface where molecular species that contact the antibiological sorbent can be sorbed and/or biological species that contact the antibiological sorbent can come into contact with the antibiological sorbent (e.g., trapped, entangled, adhere to, reversibly, irreversibly, etc.) and thereafter deactivated. For example, the antibiological sorbent can be disposed on a fluid filter (e.g., within a fluid filtration system, within a ventilation system, within an HVAC system, etc.). However, the antibiological sorbent does not have to be applied to a surface (e.g., can be used as a free-floating powder within a fluid, can be formed into a desired shape, etc.). In examples, the antibiological sorbent is used in settings with a high relative humidity and/or in sensitive settings (e.g., hotel, restaurant, pharmaceutical, medical, etc.); however, the antibiological sorbent can be used in any other setting.

The specific surface area of antibiological sorbent (e.g., carbon particles, activated carbon, activated carbon particles, sorbent particles, sorbent material, coated sorbent material, coated carbon particles, etc.) is preferably greater than about 100 m²/g (e.g., 500-5000 m²/g, 100-500 m²/g, 100-1000 m²/g, 100 m²/g, 200 m²/g, 300 m²/g, 500 m²/g, 750 m²/g, woo m²/g, 1250 m²/g, 1500 m²/g, 2000 m²/g, 2500 m²/g, 3000 m²/g, 5000 m²/g, >5000 m²/g, etc.), but can be less than 100 m²/g (e.g., 75-100 m²/g, 50-100 m²/g, 25-75 m²/g, 75 m²/g, 50 m²/g, <25 m²/g, etc.). The surface area of the antibiological sorbent is preferably substantially the same as (e.g., differs by less than 1%, differs by less than 2%, differs by less than 5%, differs by less than 10%, differs by less than 20%, etc.) the specific surface area of the constituent sorbent material (e.g., as discussed below), but can be different from (e.g., differ by more than about 20%) the constituent sorbent material. In examples, a surface area within the preferred range can confer the benefit of enhancing the sorption capacity of the antibiological sorbent.

The sorption capacity of the antibiological sorbent is preferably at least 10 grams of molecular species per 100 grams of antibiological sorbent (e.g., greater than or equal to: 10-100 g sorbate/100 g antibiological sorbent; 10-40 g sorbate/100 g antibiological sorbent; 20 g sorbate/100 g antibiological sorbent; 25 g sorbate/100 g antibiological sorbent; 30 g sorbate/100 g antibiological sorbent; 40 g sorbate/100 g antibiological sorbent; 50 g sorbate/100 g antibiological sorbent; 75 g sorbate/100 g antibiological sorbent; 100 g sorbate/100 g antibiological sorbent; 200 g sorbate/100 g antibiological sorbent; etc.), but can be less than 10 grams of molecular species (e.g., sorbate, adsorbate, absorbate, etc.) per 100 grams of antibiological sorbent. The sorption capacity of the antibiological sorbent (e.g., coated carbon particles) is preferably substantially the same as (e.g., differs by less than 1%, differs by less than 2%, differs by less than 3%, differs by less than 5%, differs by less than 10%, differs by less than 20%, etc.) the sorption capacity of the constituent sorbent material (e.g., porous carbon particles, as discussed below, etc.), but can be different from (e.g., differ by more than about 20%, more than about 25%, more than about 30%, etc.) the constituent sorbent material. The sorption capacity can differ by a positive or a negative amount relative to the constituent sorbent material.

The antibiological sorbent preferably has a high thermal stability. In examples, at elevated temperatures (e.g., above 80° F., above 90° F., above 100° F., above 120° F., above 140° F., above 160° F., above 200° F., above 250° F., above 300° F., etc.) and/or low temperatures (e.g., below 60° F., below 50° F., below 40° F., below 32° F., below 20° F., below 10° F., below 0° F., below −10° F., etc.), the sorption capacity of the antibiological sorbent remains substantially the same as (e.g., within 95%-105%, within 90-100%, within 80%-100%, within 75%, within 80%, within 85%, within 90%, within 95%, etc.) the sorption capacity of the antibiological sorbent at a standard temperature range (e.g., between 50° F.-100° F., between 60° F.-90° F., between 68° F.-77° F., etc.). However, the sorption capacity of the antibiological sorbent can alternatively be sensitive to temperature, and differ (e.g., above 15%, above 20%, above 30%, above 40%, above 50%, above 75%, above 100%, above 150%, etc.) above or below the sorption capacity at standard temperature under exposure to elevated and/or reduced temperatures.

In examples, the sorption capacity of the antibiological sorbent remains substantially the same as (e.g., within 95%405%, within 90-100%, within 80%-100%, within 75%, within 80%, within 85%, within 90%, within 95%, etc.) the sorption capacity of the antibiological sorbent at a standard a standard humidity (e.g., between 35-45%, between 30-50%, 30%, 40%, 50%, etc.) when exposed to a high relative humidity (e.g., between 50-60%, between 55-65%, 60%, between 60-70%, above 60%, above 70%, above 80%, etc.) and/or to a low humidity (e.g., less than 30%, less than 20%, etc.). However, the antibiological sorbent can alternatively have a sorption capacity that differs (e.g., above 15%, above 20%, above 30%, above 40%, above 50%, above 75%, above 100%, above 150%, etc.) above or below the sorption capacity at standard humidity under exposure to elevated and/or reduced humidity.

In examples, the ability of the antibiological sorbent to deactivate biological species (e.g., capacity to deactivate biological species, rate of biological species deactivation, completeness of biological species deactivation, etc) remains substantially the same as (e.g., within 95%105%, within 90-100%, within 80%-100%, within 75%, within 80%, within 85%, within 90%, within 95%, etc.) the ability of the antibiological sorbent to deactivate biological species at a standard a standard humidity (e.g., between 35-45%, between 30-50%, 30%, 40%, 50%, etc.) when exposed to a high relative humidity (e.g., between 50-60%, between 55-65%, 60%, between 60-70%, above 60%, above 70%, above 80%, etc.) and/or to a low humidity (e.g., less than 30%, less than 20%, etc.). However, the antibiological sorbent can alternatively have an ability to deactivate biological species that differs (e.g., above 15%, above 20%, above 30%, above 40%, above 50%, above 75%, above 100%, above 150%, etc.) above or below the ability to deactivate biological species at standard humidity under exposure to elevated and/or reduced humidity.

Preferably, the antibiological sorbent can function without needing to be regenerated, which can confer the benefits of reduced downtime and costs due to regeneration. Additionally or alternatively, the antibiological sorbent can have a high regeneration capacity. In examples, the sorption capacity of the antibiological sorbent remains substantially the same (e.g., within 95%-105%, within 90-100%, within 80%-100%, within 75%, within 80%, within 85%, within 90%, within 95%, etc.) after repeated cycles of regeneration (e.g., 1 or more cycles, 2 or more cycles, 3 or more cycles, 5 or more cycles, 10 or more cycles, 25 or more cycles, 50 or more cycles, 100 or more cycles, etc.). Alternatively, the antibiological sorbent can have a low regeneration capacity (e.g., wherein sorption capacity is lost or diminished after 1 cycle, 2 cycles, 3 cycles, etc.). In examples, regeneration mechanisms can include thermal regeneration, biological regeneration, chemical regeneration, washing with distilled water under magnetic stirring, washing with ultrasound and thermal regeneration under inert atmosphere, and/or any other suitable regeneration mechanisms.

The antibiological sorbent (or constituents thereof such as sorbent material, antibiological material, functional material, etc.) is preferably non-toxic (e.g., not known to cause damage to mammals, median lethal dosage for oral administration (oral $LD_{50}$)>1000 mg/kg body weight, median lethal dosage for dermal administration (dermal $LD_{50}$) >5000 mg/kg, median lethal concentration for inhalation ($LC_{50}$)>20 mg/L, fish toxicity $LC_{50}$ (96 h) for Type 3>500 mg/L, non-carcinogenic, no skin corrosion and/or irritation caused by touching the material, etc.), but can alternatively be semi-toxic or toxic. In examples, non-toxic material can be defined based on no-observed-adverse-effect levels, threshold limit values, and tolerable daily intake levels, and/or any other suitable metric.

As shown in FIG. 1, the antibiological sorbent preferably includes sorbent material 200 and an antibiological material 300, and can additionally or alternatively include a functionalizing material 400 and/or any suitable material(s).

However, the antibiological sorbent can be otherwise composed.

4.1 Sorbent Material 200.

The sorbent material 200 preferably functions to sorb (e.g., absorb, adsorb, reversibly sorb, irreversibly sorb, etc.) molecular species. Additionally or alternatively, the sorbent material can function as a scaffold for the antibiological material (and/or functionalizing material), deactivate biological species, and/or otherwise function. The sorbent material preferably includes carbon (e.g., activated carbon, graphite, graphene, carbon nanotubes, activated charcoal, amorphous carbon, powdered carbon, granular carbon, extruded carbon, woven carbon, impregnated carbon, carbon nanofoam, carbide-derived carbon, etc.). However, additionally or alternatively, the sorbent material can include zeolites, metal-organic frameworks (MOFs), oxygen-containing compounds (e.g., silica, calcium carbonate, etc.), polymer-based compounds (e.g., polystyrene, polyvinylacetate, polytetrafluoroethylene, polymethylacrylic acid, polypropylene, silicone, polyimide, nylon, polyacrylamide, etc.), aerogel, xerogel, nanofoam, hypercrosslinked polymeric resins, natural inorganic materials, natural organic materials, synthetic materials, and/or any suitable material(s) and/or structure(s).

The carbon can be activated carbon, soft-templated mesoporous carbon, hard templated mesoporous carbon, activated carbon fibers, nanofibers (e.g., electrospun nanofibers), porous nanocarbons, hierarchical porous carbon, carbon nanofoam, carbide-derived carbon, graphite, and/or any suitable allotrope and/or preparation of carbon. The carbon can be in the form of particles, pellets, beads, powder, solid state, aqueous state, and/or any other suitable form and/or state (e.g., prior to S100). In variants, the carbon can optionally be produced from plant-based materials (e.g., coconut shells, coal, wood, sugarcane bagasse, soybean hulls, nutshell, etc.).

The sorbent material preferably has a large surface area (e.g., greater than about 100 $m^2$/g such as 500-5000 $m^2$/g, 100-500 $m^2$/g, 100-1000 $m^2$/g, 100 $m^2$/g, 200 $m^2$/g, 300 $m^2$/g, 500 $m^2$/g, 750 $m^2$/g, 1000 $m^2$/g, 1250 $m^2$/g, 1500 $m^2$/g, 2000 $m^2$/g, 2500 $m^2$/g, 3000 $m^2$/g, 5000 $m^2$/g, >5000 $m^2$/g, etc.), but can have any suitable surface area (e.g., less than 100 $m^2$/g, <100 $m^2$/g, 75-100 $m^2$/g, 50-100 $m^2$/g, 25-75 $m^2$/g, 75 $m^2$/g, 50 $m^2$/g, <25 $m^2$/g, etc.).

The sorption capacity of the sorbent material is preferably at least 10 grams of molecular species per 100 grams of sorbent material (e.g., greater than or equal to: 10-100 g/100 g sorbent material; 10-40 g/100 g sorbent material; 20 g/100 g sorbent material; 25 g/100 g sorbent material; 30 g/100 g sorbent material; 40 g/100 g sorbent material; 50 g/100 g sorbent material; 75 g/100 g sorbent material; 100 g/100 g sorbent material; 200 g/100 g sorbent material; etc.), but can be less than 10 grams of molecular species per 100 grams of sorbent material.

The sorbent material is preferably porous, but can additionally or alternatively be hollow, solid, and/or have any suitable morphology. The porosity of the sorbent material is preferably between about 10% and 90%, but can be less than 10% or greater than 90%. The pore size (e.g., pore width) of the sorbent material can be <2 nm (e.g., nano or micropores), 2-50 nm (e.g., mesopores), and/or >50 nm (e.g., macropores). The pore wall thickness (e.g., pore strut) is preferably between about 1 and 7 graphene sheets (e.g., between about 0.335 nm and 3.185 nm), but can be less than about 1 graphene sheet or greater than about 7 graphene sheets. The sorbent material is preferably amorphous, but can additionally or alternatively be graphitic, crystalline, and/or have any suitable morphology.

A characteristic size of the sorbent material (e.g., particles thereof such as diameter, largest dimension, shortest dimension, length, width, depth, etc.) is typically between about 1-100 μm. However, the characteristic size can be less than 1 μm or greater than 100 μm. As referred to herein, in examples "characteristic size" can refer to a mean size, an average size, a percentile value read from a cumulative size distribution (e.g., d10, d50, d90, etc.), and/or any other suitable statistical parameter. This definition, and any other definitions disclosed herein, can be applied to any material referred to herein (e.g., particles and/or pores of: the sorbent material, the antibiological sorbent, the antibiological material, the functionalizing material, the antibiological precursor, etc.).

The sorbent material morphology (e.g., of particles of the sorbent material) can be spheroidal (e.g., spherical, oblate spheroid, prolate spheroid, etc.), polyhedral, pyramidal, cylindrical, hemi-spheroidal, and/or can have any suitable morphology.

However, the sorbent material can be otherwise composed.

4.2 Functionalizing Material 400.

The optional functionalizing material 400 can function to enhance the capacity (e.g., sorption capacity) of the antibiological sorbent and/or antibiological material to sorb molecular species (e.g., chemisorption), and/or can otherwise function. In a preferred variant, the functionalizing material is an activating material used to produce activated carbon from the carbon. The functionalizing material can additionally or alternatively function to: increase the thermal stability of the antibiological sorbent, increase the regeneration capacity of the antibiological sorbent, enhance chemisorption of gases with low affinity for the antibiological sorbent, can catalyze degradation of a molecular species (e.g., VOC), and/or otherwise affect any material properties of the antibiological sorbent. The functionalizing material preferably does not affect (e.g., does not reduce, does not significantly change, etc.) a function of the antibiological material (e.g., sorption capacity and/or ability to deactivate the biological species) and/or sorbent material. Alternatively, the functionalizing material can synergistically enhance the antibiological material function, can be detrimental to the antibiological material function, and/or otherwise affect the antibiological material function.

The antibiological material and/or the sorbent material can optionally be surface functionalized (e.g., by applying the functionalizing material to a surface of the sorbent material and/or antibiological material). The surface functionalization can function to target specific molecular or biological species, improve sorption of molecular species, improve deactivation of biological species, improve coupling of the antibiological material to the sorbent material, improve coupling of the system to a surface, and/or can otherwise function.

The functionalizing material preferably includes manganese oxide (e.g., manganese oxide nanoparticles, exclusively includes manganese oxide, etc.), but can additionally or alternatively include acids (e.g., phosphoric acid), bases (e.g., hydroxides such as potassium hydroxide, sodium hydroxide, etc.; carbonates or bicarbonates such as potassium carbonate, sodium bicarbonate, etc.; etc.), salts (e.g., calcium chloride, zinc chloride, etc.), particles (e.g., nanoparticle, mesoparticles, macroparticles, etc.), and/or other suitable chemical agents. The functionalizing material is preferably inorganic, but can additionally or alternatively include organic materials. Exemplary functional groups include: hydroxy, sulfhydryl (sulfanyl, thiol, etc.), selenyl, tellurenyl, sulphonate, sulphone, halides or halogens (e.g., chlorine/chloride, bromine/bromide, ionidne/iodide, fluorine/fluoride, etc.), pnictogen (e.g., nitrogen, phosphorous, arsenic, antimony, bismuth, etc. groups), borates, silanes, and/or any suitable functional groups (such as esters, ethers, amides, amines, sugars, aromatics, aliphatics, surfactants, etc.) can be used.

The functionalizing material can be dispersed on (e.g., disposed on, deposited on, etc.) one or more surfaces of the sorbent material (e.g., an external surface of the sorbent material, an internal surface of the sorbent material, etc.), can coat the sorbent material (e.g., conformally coat, evenly coat surfaces, coat external surfaces, coat internal surfaces, unevenly coat such as different thickness on an inner surface and an exterior surface, etc.), can intercalate within pores of the sorbent material, can form a mixture (e.g., alloy, molecular compound, composite, etc.) with the sorbent material, and/or otherwise be dispersed on the sorbent material. In a specific example, the functionalizing material can be dispersed on environment facing surfaces of sorbent material particles, including an exterior surface and a plurality of pore surfaces. The functionalizing material preferably does not block or completely obstruct pores or other surface structures of the sorbent material. However, the functionalizing material can partially or fully obstruct the pore or other structures and/or otherwise be configured. The functionalizing material can additionally or alternatively be dispersed on one or more surfaces of the antibiological material.

In variants, the system can contain between 0.1%-5% (e.g., between 0.1-1%, 0.5%-1%, between 0.5%-1.5%, between 1%-2%, between 2%-4%, between 1.5%-3.5%, between 3%-5%, less than 1%, less than 2%, less than 3%, less than 4%, less than 5%, greater than 1%, greater than 2%, greater than 3%, greater than 4%, etc.) of functionalizing material (e.g., by weight, by mass, by mole percentage, by stoichiometry, etc.). However, the antibiological sorbent can contain less than 0.1% of functionalizing material (e.g., 0%, 0.01%, 0.05%, etc.), or more than 5% of functionalizing material (e.g., 6%, greater than 5.5%, greater than 7%, greater than 10%, etc.). In variants, the percentage of functionalizing material can be measured relative to the sorbent material (e.g., amount of sorbent material), relative to the antibiological sorbent (e.g., carbon and antibiological material), relative to the antibiological material, and/or relative to any suitable reference material (e.g., precursors in the method).

The functionalizing material can be particulate (e.g., nanoparticle, mesoparticles, microparticle, etc.), thin film, clusters, and/or have any suitable structure. In various embodiments of the functionalizing material, the functionalizing material can be hollow, solid (e.g., powder), porous, liquid (e.g., sprayed), and/or have any suitable structure.

In variants, the functionalizing material can be applied to the sorbent material as a part of the method (e.g., S200), the sorbent material used for the method can be received with the functionalizing material already applied, and/or the functionalizing material can be otherwise applied.

As a specific example, carbon particles decorated with (e.g., coated with, including, loaded with, etc.) functionalizing material (e.g., manganese oxide nanoparticles) can be referred to as "activated carbon" and/or "functionalized carbon". In variations where the activated carbon is decorated with antibiological material (e.g., selenium particles, copper oxide particles, etc., the resulting material can be referred to as "antibiological carbon" and/or "antimicrobial carbon." Similarly, virgin carbon (e.g., carbon that is not decorated with functionalizing material) that is decorated with antibiological carbon can be referred to as "antibiological carbon" and/or "antimicrobial carbon." However activated carbon, antibiological carbon, and/or antimicrobial carbon can otherwise be defined.

However, the functionalizing material can be otherwise composed.

4.3 Antibiological Material 300.

The antibiological material 300 preferably functions to deactivate biological species. Additionally or alternatively, the antibiological material can function to sorb molecular species, catalyze degradation of molecular species, and/or perform any suitable function. The antibiological material can deactivate the biological species by disrupting a cell membrane or cell wall of the biological species, by desiccating the biological species, by generating one or more reactive species (e.g., free radicals, ions, electrons, oxidizing agents, reducing agents, etc.), by hindering and/or disrupting protein or peptide folding, by interfering with nucleotide bonding, by an oligodynamic effect, by interfering with essential elements (e.g., by outcompeting and/or out binding other elements, depriving the biological species of the essential element(s), etc.), and/or otherwise deactivate the biological species. The inclusion of the antibiological material on the sorbent material preferably does not substantially affect (e.g., does not substantially worsen) a sorption capacity of the constituent sorbent material (e.g., changes the sorption capacity by less than 5% such as by 3%, 2%, 1%, 0.5%, 0.1%, 0.05%, 0.01%, etc.). However, the antibiological material can alternatively enhance or decrease the sorption capacity. Additionally or alternatively, the inclusion of the antibiological material on a functionalized sorbent material preferably does not substantially affect (e.g., does not substantially worsen) a sorption capacity of the constituent functionalizing material (e.g., changes the sorption capacity by less than 5% such as by 3%, 2%, 1%, 0.5%, 0.1%, 0.05%, 0.01%, etc.).

Examples of the antibiological material (e.g., sorbent material that includes the antibiological material) have been shown to deactivate (e.g., kill, capture, destroy, render harmless, prevent from reproducing, etc.) biological species (e.g., bacteria, fungi, viruses, mold, mildew, microbes, etc.) more effectively than sorbent material in the absence of antibiological material. In an example shown in FIG. 7A, greater microbial growth is exhibited on sorbent material (e.g., carbon) without the antibiological material, as compared to the antibiological sorbent in FIG. 7B.

The antibiological material can be dispersed (e.g., disposed, deposited, etc.) on the surface of the sorbent material (e.g., an external surface of the sorbent material, an internal surface of the sorbent material, etc.), can coat the sorbent material (e.g., conformally coat, evenly coat surfaces, coat external surfaces, coat internal surfaces, unevenly coat such as different thickness on an inner surface and an exterior surface, etc.), can intercalate within pores of the sorbent material, and/or otherwise be dispersed on the sorbent material. The antibiological material preferably does not block or completely obstruct pores or other surface structures of the sorbent material (e.g., does not substantially change a specific surface area of the sorbent material such as changing the specific surface area by less than about 5%; does not substantially change a porosity or pore volume of the sorbent material such as changing the porosity or pore volume by less than about 5%; etc.). However, the antibiological material can partially or fully obstruct the pore or other structures and/or otherwise be configured. In a specific example, the antibiological material can be dispersed on environment facing surfaces of the sorbent material, including an exterior surface and/or pore surfaces.

The ratio (e.g., mass ratio, volumetric ratio, stoichiometric ratio, etc.) of antibiological material to sorbent material can be between 1:0.01 and 1:200 (e.g., between 1:0.01 and 1:1, between 1:0.5 and 1:2, between 1:1 and 1:5, between 1:2 and 1:10, between 1:5 and 1:20, between 1:10 and 1:40, between 1:20 and 1:50, between 1:40 and 1:70, between 1:50 and 1:100, between 1:90 and 1:110, 1:95, 1:100, 1:105, 1:110, etc.). However, the ratio can be less than 1:0.01 or greater than 1:200 (e.g., greater than 1:225, greater than 1:300, etc.).

The antibiological material can be particulate (e.g., nanoparticles, mesoparticles, microparticles, etc.), thin film, clusters, and/or have any suitable structure. In various embodiments of the antibiological material, the antibiological material can be hollow, solid (e.g., with a porosity less than about 5%), porous (e.g., with a porosity between about 5% and 95% as measured using BET techniques, comparing a density or volume of the antibiological material to a density of the same material without pores, imbibition methods, water saturation methods, gas expansion, thermoporosimetry, cryoporometry, etc.; such as nanoporous, microporous, mesoporous, etc.), and/or have any suitable structure. These embodiments can be beneficial as they may enable sorption of molecular species by the antibiological material, can be used to modify a weight (e.g., increase such as to increase a loading of the antibiological material or decrease such as to decrease a total weight of the system) of the antibiological sorbent, and/or can provide any suitable benefits. In some variations of these embodiments, a mixture of porous and nonporous antibiological material can be formed or included (e.g., simultaneously formed; sequentially formed such as by forming antibiological material, etching pores in the antibiological material, then forming additional antibiological material; etc.). The mixture can include any relative amount of porous to nonporous antibiological material (e.g., particles) such as 0% to 100% (e.g., by volume, by mass, etc., where the ratio can be an artifact of the manufacturing method, can be intentionally engineered, etc.).

The antibiological material particles can be spheroidal, rod-like, cubic, decahedral, icosahedral, octahedral, tetrahedral, toroidal, capsule-like, platelet, flower-like, prismatic, bar-shaped, stellate (e.g., star-shaped), and/or have any suitable morphology. A characteristic size (e.g., thickness, grain size, diameter, circumference, radius, maximum extent along a reference axis, minimum extent along a reference axis, etc.) of the antibiological material is preferably at most equal to the pore size of the sorbent material. However, the characteristic size can be larger than the pore size. The characteristic size is preferably 2-500 nm (e.g., 2-5 nm, 2-10 nm, 2-20 nm, 10-30 nm, 20-nm, 30-50 nm, 20-50 nm, 40-60 nm, 50-70 nm, 60-80 nm, 70-90 nm, 80-100 nm, 50-200 nm, 150-300 nm, 100-500 nm, 250-500 nm, etc.), but can be less than 2 nm (e.g., 1.5 nm, 1 nm, 0.5 nm, 0.25 nm, less than 1 nm, less than 0.5 nm, etc.) and/or greater than 500 nm (e.g., greater than 550 nm, greater than boo nm, greater than 750 nm, greater than 1 micron, between 1 micron and 1 mm, greater than 1 mm, etc.). In a specific example, when the antibiological material is in the form of nanoparticles, the inclusion of nanoparticles with a small characteristic size (e.g., less than 1 micron, less than 500 nm, less than 100 nm, less than 10 nm, etc.) can confer the benefit of providing more binding sites than a larger nanoparticle (e.g., greater than 1 micron, greater than 500 nm, etc.), which can increase an affinity of the nanoparticles to bind with biological species, and thus increase the ability (e.g., rate, degree of deactivation, etc.) of the antibiological sorbent to deactivate biological species.

The antibiological particulate material (e.g., antibiological particles) can be generated in-situ to target deposition on the surface, macropores, mesopores, and/or nanopores of the sorbent material. Additionally or alternatively, the antibiological particulate material can be generated prior to deposition. In variants, the size of antibiological particles can be controlled (e.g., during the manufacturing process) without adding capping agent or particle-size controlling chemistry. The absence of a capping agent can provide the technical advantages of increasing a binding affinity (e.g., number of accessible binding sites) of the antibiological particles, increasing an ability (e.g., capacity, rate, efficacy, performance, etc.) of antibiological sorbent to deactivate biological species, increasing adhesion (e.g., bond strength) between the antibiological particles and the sorbent material, and/or other suitable benefits. However, the size of antibiological particles can alternatively be controlled with a capping agent (e.g., surfactants, lipids, fatty acids, phosphates, small ligands, polymers, dendrimers, cyclodextrins, polysaccharides, etc.), and/or other particle-size controlling chemistry. The antibiological particles can have good adhesion on the sorbent materials, which prevent leaching of antibiological materials in the fluid system. Preferably, the generated particles are attached to a surface of the sorbent material without the use of an adhesive (e.g., without a binder), but can alternatively be attached with an adhesive. The absence of a binder can be particularly beneficial as it can increase the adhesion (e.g., bond strength) of the anti-biological materials to the sorbent material.

Figure 8:
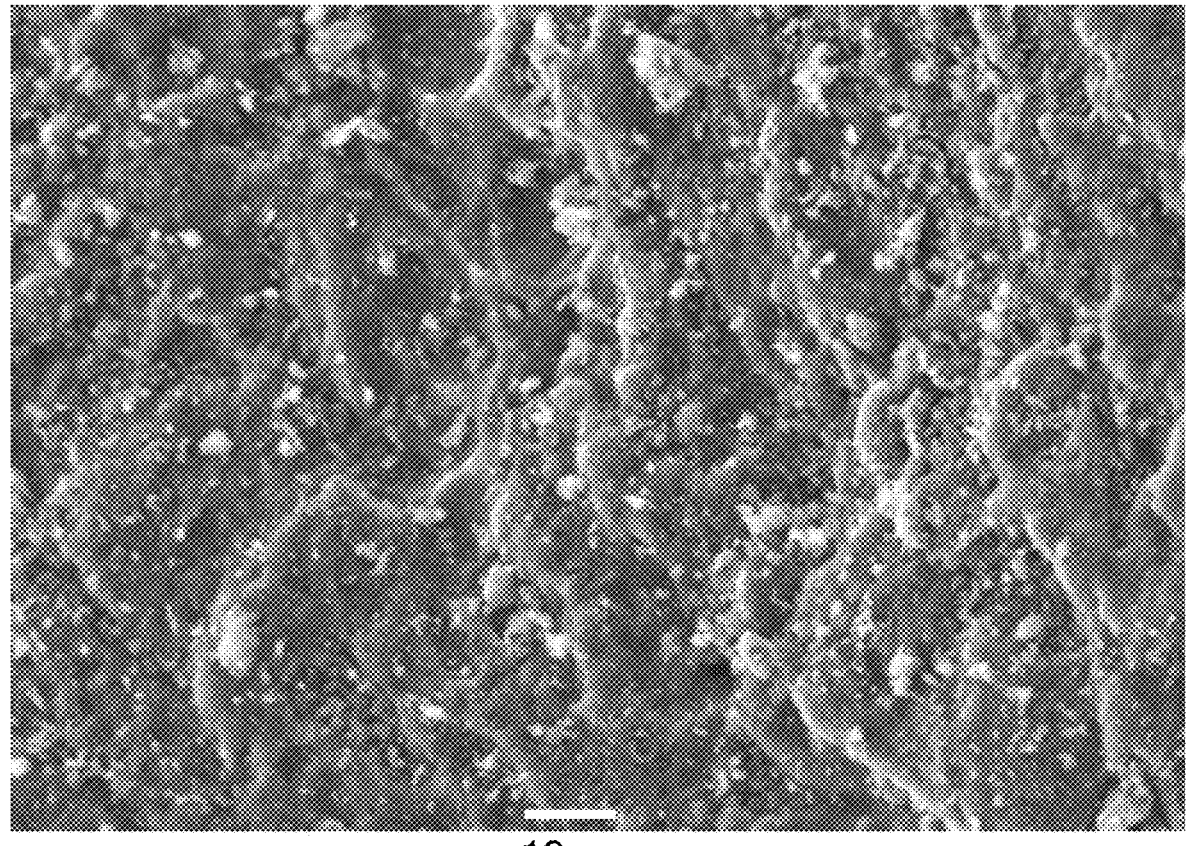
FIG. 8 is an example scanning electron micrograph (SEM) image of uncoated control carbon material (e.g., carbon material excluding an antibiological coating).
Figure 9:
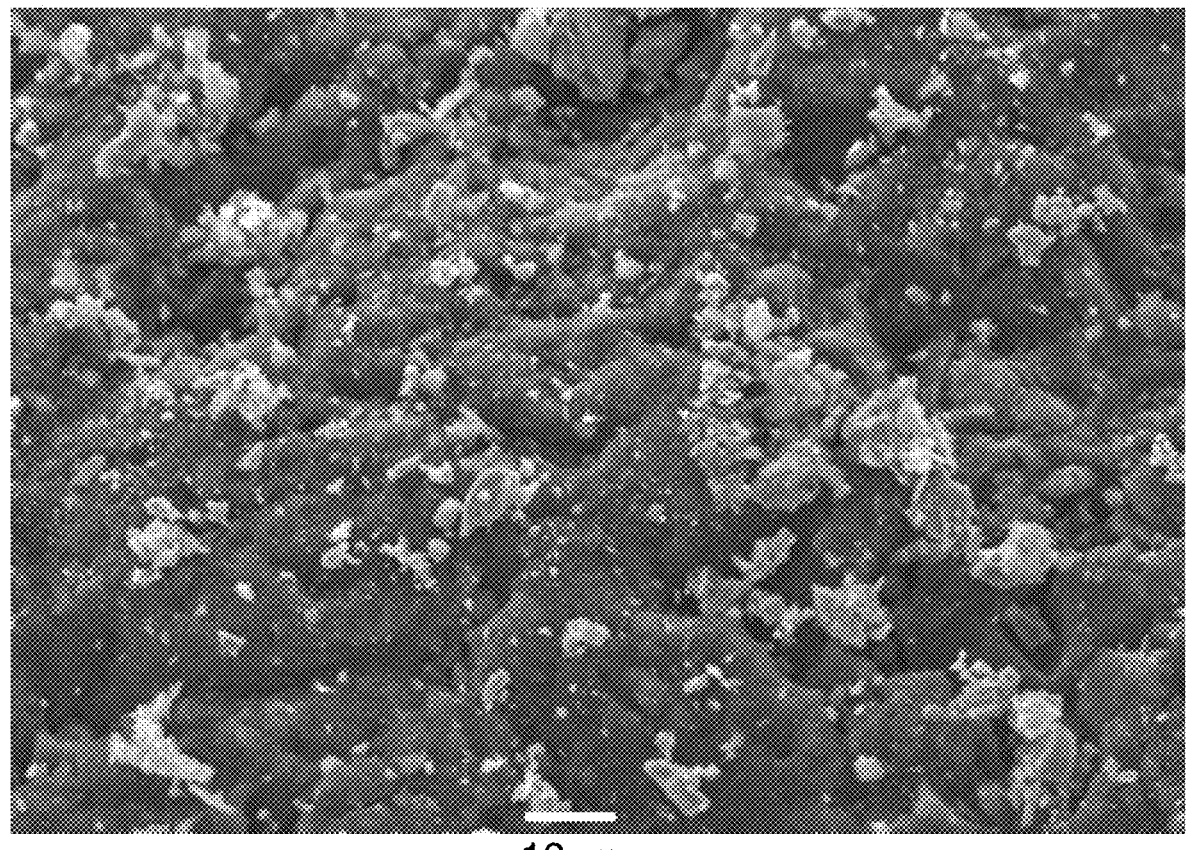
FIG. 9 is an example SEM of carbon material with antibiological coating.

In variants, the micro, meso, and/or macropores of the sorbent material can be unblocked or minimally blocked (example shown by comparing FIG. 8 and FIG. 9), which can result in an insignificant impact on the sorption capacity and kinetics.

The antibiological material is preferably a chalcogenide (e.g., sulfur, selenium, tellurium, etc.) and/or a light transi-tion metal (e.g., a transition metal selected from the fourth period of the periodic table such as scandium, chromium, iron, titanium, zinc, nickel, manganese, vanadium, cobalt, copper, etc.) or oxide derived therefrom. Chalcogenides (particularly selenide) are generally preferred for their low cost and because of their lower toxicity (e.g., mammalian toxicity) and/or easier disposal (or recycling) compared to other options (such as compared to silver, cadmium, nickel, cobalt, etc.). The antibiological material preferably does not include organic material, which can optionally confer the benefit of eliminating or shortening a step of rejuvenating (e.g., by heating, etc.) the sorbent material (e.g., after S300, during S400, etc.) in the case that the organic material saturates the sorbent material (e.g., when the sorbent mate-rial comprises carbon). Alternatively, the antibiological material can include organic material. The antibiological material is preferably non-silver (e.g., not silver, lacks silver, includes less than a threshold amount such as 1% of silver, etc.). However, the antibiological material can additionally or alternatively include: transition metal (e.g., a transition metal selected from the fifth or sixth period of the periodic table such as yttrium, zirconium, niobium, molybdenum, ruthenium, rhodium, palladium, silver, cadmium, lutetium, hafnium, tantalum, tungsten, rhenium, osmium, iridium, platinum, gold, mercury, etc.), lanthanides and/or actinides (e.g., gadolinium), transition metal oxides, transition metal sulfides, transition metal selenides, transition metal tellu-rides, nitrates (e.g., copper nitrate), sulfates, and/or any suitable materials.

In some variants, a combination of antibiological mate-rials can be beneficial for improved (e.g., greater, faster, broader spectrum such as to target a greater variety of, longer lifetime, etc.) biological species deactivation. In a specific example, the antibiological material includes sele-nium nanoparticles and copper oxide nanoparticles. The copper oxide nanoparticles can include copper (II) oxide (CuO) nanoparticles, copper (I) oxide ($Cu_2O$) nanoparticles, $Cu_xO$ (for x between 1 and 2 such as 1.1, 1.2, 1.3, 1.4, 1.5, 1.6, 1.7, 1.8, 1.9, values or ranges therebetween, etc.) nanoparticles, $CuO_x$ (e.g., for x less than 1 such as 0.9, 0.8, 0.7, 0.6, 0.5, etc.) and/or combinations thereof. In a specific variation, the antibiological material can include a mixture of $Cu_2O$ and CuO (either as distinct particles or by having incompletely oxidized nanoparticles such as $Cu_xO$ or $CuO_x$) where a ratio (e.g., mass ratio, volume ratio, particle count ratio, stoichiometric ratio, etc.) of $Cu_2O$ to CuO can be between 10:1 and 1:10. The ratio of copper oxide to sele-nium is preferably between 20:1 and 1:20 (e.g., approxi-mately 20:1, 15:1, 12:1, 10:1, 9:1, 8:1, 7:1, 6:1, 5:1, 3:1, 2:1, 1:1, 1:2, 1:3, 1:4, 1:5 1:6, 1:7, 1:8, 1:9, 1:10, 1:12, 1:15, 1:20, between 20:1-15:1, between 18:1-12:1, between 15:1-10:1, between 12:1-3:1, between 9:1-3:1, between 6:1-5:1, between 5:1-4:1, between 5.5:1-4.5:1, between 6:1-4:1, between 7:1-3:1, between 3:1-1:3, between 2:1-1:1, between 1:1-1:2, between 1:3-1:7, between 1:4-1:6, between 1:4.5-

1:5.5, between 1:4-1:5, between 1:5-1:6, between 1:3-1:9, between 1:3-1:12, between 1:10-1:15, between 1:124:18, between 1:15-1:20, etc.), but can additionally or alterna-tively be greater than 20:1 (e.g., greater than 100:1, 50:1, 25:1, 20:1, etc.), less than 1:20 (e.g., less than 1:15, 1:20, 1:25, 1:50, 1:100, etc.), and/or any other suitable ratio.

However, the antibiological material can be otherwise composed.

5. Method of Manufacture

The method of manufacture preferably functions to manu-facture an antibiological sorbent (e.g., as disclosed above). The method of manufacture can additionally or alternatively function to manufacture an antibiological porous material, and/or to manufacture any suitable material. The method of manufacture and/or steps thereof are preferably performed at or near room temperature (e.g., ambient temperature, tem-perature between about 0-40° C.), which can confer the benefits of lowering energy requirements (e.g., associated with heating and/or cooling), reducing random reactions between system inputs and/or byproducts, and/or confer other suitable benefits. However, the method and/or steps thereof can be performed at reduced or elevated tempera-tures (e.g., where the solution temperature is increased, resulting from exothermic or endothermic reactions, etc.) and/or at any suitable temperature. Typically, steps are performed for a duration of time to ensure that equilibrium (e.g., temperature equilibrium, homogenous mixture, etc.) is achieved before proceeding to further steps. However, steps can be performed before equilibrium has been achieved and/or with any suitable timing.

As shown for example in FIG. 3, a method of manufacture for antibiological sorbent can include mixing sorbent mate-rial (e.g., sorbent particles, carbon particles, etc.) with an antibiological precursor S100 and forming antibiological material from the precursor S300. The method can option-ally include functionalizing (e.g., activating) the sorbent material S200, post-processing (e.g., washing) the resulting material S400, and/or any suitable steps. Additionally or alternatively (e.g., to S100 and S300), the method can include: forming antibiological material (e.g., nanoparticles) separately from the sorbent material, and disposing the antibiological material on the sorbent material to produce antibiological sorbent.

5.1 Mixing Sorbent Material with an Antibiological Precur-sor S100.

Mixing the sorbent material with an antibiological pre-cursor S100 functions to agitate, homogenize, and/or other-wise integrate the sorbent material and antibiological pre-cursor. The sorbent material is preferably a sorbent material as described above (e.g., a carbon material, carbon particle, etc.), but can be any other sorbent material. The sorbent material can be in the form of a: pellet, powder, solution (e.g., aqueous solution), bead, particles, and/or any other suitable form. Examples of antibiological precursors can include: selenium (e.g., selenium powder), selenium diox-ide, selenium octadecene, trioctyl-phosphine selenide, organic selenides, inorganic selenides (e.g., sodium sele-nide, potassium selenide, rubidium selenide, hydrazinium selenide, etc.), hydrogen selenide (e.g., hydrogen disele-nide), selenites (e.g., sodium selenite, boroselenites, etc.), nitrates (e.g., zinc nitrate, nickel nitrate, copper nitrate, nickel nitrate, manganese nitrate, cobalt nitrate, etc.), sul-phates (e.g., transition metal sulfate), phosphates (e.g., tran-sition metal phosphates), hydrides (e.g., transition metal hydrides), oxides (e.g., transition metal oxides), selenates (e.g., alkali metal selenates, alkaline earth metal selenates, transition metal selenates such as copper selenate, etc.), borates (e.g., transition metal borates), selenic acid, selenious acid, transition metal(s) (e.g., scandium, chromium, iron, titanium, zinc, nickel, manganese, vanadium, cobalt, copper, yttrium, zirconium, niobium, molybdenum, ruthenium, rhodium, palladium, silver, cadmium, lutetium, hafnium, tantalum, tungsten, rhenium, osmium, iridium, platinum, gold, mercury, etc.), and/or any other suitable precursor (e.g., depending on the target antibiological material composition). The ratio of sorbent material to antibiological precursor is preferably determined based on the target ratio within the antibiological sorbent (e.g., selected to be equal to the target ratio, before or after accounting for reaction yield, washing inefficiencies, etc.). For instance, the ratio (e.g., mass ratio, stoichiometric ratio, volumetric ratio, etc.) of sorbent material to antibiological material (e.g., each antibiological material, total antibiological material, etc., when more than one antibiological material is included) can be between about 500:1 and 50:1 (e.g., such as 100:1). When the ratio is too high, the antibiological effect can be insufficient and when the ratio is too low, pores of the sorbent material can be loaded resulting in decreased sorption capacity and/or worse kinetics (e.g., slower uptake, slower release, incomplete release, etc.). However, the ratio of sorbent material to antibiological precursor can otherwise be determined.

In variants where the antibiological material includes a plurality of antibiological materials, a plurality of precursors can be used (e.g., a separate precursor for each antibiological material), a single precursor that can form a plurality of different antibiological materials can be used, and/or any suitable precursors can be used. The plurality of antibiological materials can be formed sequentially (e.g., by performing the method or steps thereof using a first precursor followed by repeating the method or steps thereof with the antibiological sorbent material from the first instances with a second or further precursor), contemporaneously (e.g., simultaneously, concurrently, etc. such as by using two or more precursors during an instance of the method or steps thereof), and/or can be performed with any suitable timing. In a first example, a selenium precursor (e.g., selenium particles) and a copper (e.g., copper oxide) precursor (e.g., copper nitrate) can be mixed with a sorbent material (e.g., carbon particles, activated carbon particles, etc.). In a second specific example, a precursor for both selenium and copper (e.g., copper oxide) such as copper selenide (particularly in an acidic mixture), copper selenate, copper selenite, and/or other suitable salts that contain selenium and copper can be mixed with the sorbent material. However, any suitable precursors or combination of precursors could be used. The ratio of precursors preferably matches a target ratio of antibiological materials in the resulting antibiological sorbent. For instance, to achieve a 5:1 ratio by mass of selenium particles to copper oxide particles, a mass ratio of selenium to copper nitrate would be approximately 1.7 g selenium to per 1 gram of copper nitrate (assuming similar reaction efficiencies and utilization) would be mixed with the sorbent material.

Mixing the sorbent material and antibiological precursor can include stirring, agitating, shaking, vortexing, ultrasonication, blending, milling, and/or any suitable mixing processes. Mixing can occur for a specific time duration (e.g., 10 minutes, 20 minutes, 30 minutes, 60 minutes, 2 hours, 4 hours, 6 hours, 8 hours, 12 hours, 24 hours, 48 hours, 96 hours, etc.), until a condition is met (e.g., precursor is fully or sufficiently dissolved; sorbent material and precursor achieve a target or sufficient homogeneity such as measured by visual inspection, using light scattering, light transmission, light reflection, light absorption, fluorescence, scanning measurements, etc.; at least a desired proportion of the antibiological precursor is situated inside of a set of pores of the sorbent material; etc.), and/or for any other duration.

The sorbent material and antibiological precursor can be mixed in the solid state, liquid state (e.g., in a solution, in a slurry, in the presence of a solvent, etc.), mixed states (e.g., one component in solid state and the other in a liquid state), and/or can be mixed in any suitable state. The sorbent material and antibiological precursor are preferably mixed in a solvent (e.g., water, ethanol, methanol, propyl alcohol, ether, octadecene, etc.). The solvent can be a neat solvent and/or a solvent mixture. The solvent is preferably aqueous, but can additionally or alternatively include a non-aqueous solvent. Using an aqueous solution (e.g., an exclusively aqueous solvent, a solvent that only includes water, a solvent that is essentially only water, an aqueous solution with less than about 1 ppb, 10 ppb, 100 ppb, 1 ppm, 10 ppm, 100 ppm, 0.0001%, 0.001%, etc. organic materials; etc.) can be advantageous as other solvents (particularly organic solvents) can be sorbed by the sorbent material. In variants, aqueous solutions can include salts (e.g., to modify an ionic strength of the mixture), acids, bases, and/or other suitable species (e.g., inorganic species). The solvent can include inorganic and/or organic materials.

The sorbent material can be mixed in the solvent prior to adding antibiological precursor(s), the antibiological precursor(s) can be mixed in the solvent prior to adding sorbent material, the sorbent material and antibiological precursor can be mixed in the solvent simultaneously, the sorbent material and the antibiological precursors can be mixed as solids before mixing in the solvent, and/or the sorbent material, precursors, and/or solvent can be mixed in any order. The sorbent material and antibiological precursor can be mixed with the solvent to form a solution, slurry, and/or any other suitable mixture.

In a first example, an antibiological precursor can completely dissolve in the solvent, forming a solution, where carbon particles (or other sorbent material) can be suspended in the solution (e.g., form a colloid, slurry, etc.). In a variation of the first example, the precursor can includes $Cu(NO_3)_2$, which dissolves substantially completely in an aqueous solution to form $Cu^{2+}$ ions (and nitrate anions).

In a second example, the precursor does not completely dissolve (e.g., not dissolve, partially dissolve, etc.) in the solvent, thereby forming a slurry (with both sorbent material such as carbon particles and the precursor suspended in the solvent). In a variation of the second example, the precursor can include selenium powder.

The sorbent material and antibiological precursor are preferably mixed in an inert atmosphere, but can be mixed in a reactive atmosphere, a standard atmosphere (e.g., exposed to air, dry air, wet air, etc.), a controlled atmosphere (e.g., with a predetermined amount of reducing agent, with a predetermined amount of oxidizing agent, with a predetermined reactive species, including a scavenger, etc.), and/or in any suitable atmosphere. In examples, the inert atmosphere can include a high concentration (e.g., 100%, greater than 99%, greater than 98%, greater than 97%, greater than 95%, greater than 90%, etc.) of an inert gas (e.g., helium, neon, argon, krypton, carbon dioxide, nitrogen, radon, xenon, etc.).

The method can optionally include creating an inert atmosphere S101, which can optionally include sparging (e.g., with an inert gas), freeze-thaw, atmosphere exchange, distilling, using scavenger(s) (e.g., oxygen scavenger such as pyrogallic acid, iron or iron carbonate optionally including a metal halide catalyst, ascorbate, sodium bicarbonate, etc.), and/or other suitable methods to set the atmosphere (e.g., including dissolved gases within a solvent or solution, an environment proximal the mixture, etc.) to a target composition. S101 can be performed to the solvent, to the contents of a container holding the solvent and the sorbent material and/or precursor prior to and/or during mixing, to a mixture of the sorbent material and/or precursor, and/or to any other materials. S101 can be performed prior to mixing the sorbent material and the antibiological precursor, while mixing the sorbent material and the antibiological precursor, after mixing the sorbent material and the antibiological precursor, and/or at any other suitable time. In some variants, the use of carbon dioxide as the inert gas can provide a technical advantage as carbon dioxide will dissolve in an aqueous solution acidifying the solution (which can result in enhanced reduction and/or oxidation kinetics, improved precursor dissolution, etc.).

In a first variant, sorbent material (e.g., particles, pellets, powder, etc.) can be mixed in a solvent (e.g., water). After a predetermined time (e.g., 1 minute, 5 minutes, minutes, 20 minutes, 30 minutes, 1 hour, 2 hours, 4 hours, etc.), the antibiological precursor can be added and the mixture mixed for a second predetermined amount of time (e.g., 1 minute, 5 minutes, 10 minutes, 20 minutes, 30 minutes, 1 hour, 2 hours, 4 hours, etc.; the same or different from the predetermined amount of time). For the duration of mixing in this specific example, the mixture(s) are preferably under an inert atmosphere (e.g., ≥0.90% nitrogen, ≥0.90% $Co_2$, etc.). However, in variations, the inert atmosphere can be introduced prior to adding the antibiological precursor and/or be introduced at any suitable time and/or not introduced. In specific example, the antibiological precursor can include selenium powder and/or copper nitrate.

In a second variant, sorbent material and an antibiological precursor can be added to a solvent (e.g., water) and mixed for a predetermined amount of time (e.g., 1 minute, 5 minutes, 10 minutes, 20 minutes, 30 minutes, 1 hour, 2 hours, 4 hours, etc.). For the duration of mixing in this specific example, the mixture(s) are preferably under an inert atmosphere (e.g., ≥0.90% nitrogen). S101 can be performed prior to adding the sorbent material and the antibiological precursor, after adding the sorbent material and the antibiological precursor but prior to mixing, during mixing of the sorbent material and the antibiological precursor (e.g., where sparging or bubbles formed during sparging may be used as the mixing mechanism), and/or after the sorbent material and antibiological material have been mixed (e.g., before S200, before S300, before S400, etc.). However, in variations, the inert atmosphere can be introduced after mixing, during mixing, and/or be introduced at any suitable time and/or not introduced. In specific example, the antibiological precursor can include selenium powder and/or copper nitrate.

However, mixing sorbent material with an antibiological precursor S100 can be otherwise performed.

5.2 Functionalizing the Sorbent Material S200.

The method can optionally include functionalizing the sorbent material S200, which can function to activate and/or otherwise enhance the capacity of the antibiological sorbent and/or antibiological material to sorb and/or degrade molecular species (e.g., enhance the sorption capacity). Additionally or alternatively the method can be performed using activated sorbent material (e.g., S100 can use sorbent material that has already been activated or functionalized)

and/or otherwise functionalized sorbent material. In variants, functionalizing the sorbent material S200 can be performed prior to S100, during S100, or after S100 (e.g., before S300, after S300, before S400, after S400, etc.).

In variants, functionalizing the sorbent material can increase a sorption capacity of the functionalized sorbent material as compared to the raw or virgin sorbent material by between 10%-100% (e.g., 10%-50%, 30%-70%, 50%-90%, 80%-100%, 100%, etc.). However, functionalizing the sorbent material can increase the sorption capacity by less than 10% (e.g., 5%-10%, less than 5%, etc.), by more than 100% (e.g., by 100%-150%, by greater than 150%, by greater than 200%, by greater than 300%, etc.).

Preferably, functionalizing the sorbent material (e.g., porous carbon particles) does not substantially change one or more of the antibiological properties of the antibiological sorbent produced from the sorbent material (e.g., coated carbon particles). In examples, variants of the antibiological sorbent that include functionalized sorbent material (e.g., wherein the sorbent material is functionalized before, during, or after applying the antibiological material) exhibit substantially the same antibiological properties as variants of the antibiological sorbent that do include non-functionalized sorbent material (e.g., the difference between properties of functionalized vs. non-functionalized antibiological sorbent is a: 0% difference, less than 0.5% difference, less than 1% difference, less than 2% difference, less than 3% difference, less than 5% difference, etc.). However, functionalizing the sorbent material can alternatively substantially increase or substantially decrease one or more of the antibiological properties of the antibiological sorbent (e.g., by greater than 0.5%, greater than 1%, greater than 2%, greater than 3%, greater than 5%, greater than 10%, greater than 20%, etc.).

In variants, functionalizing the sorbent material can include adding (e.g., mixing, depositing, etc.) a functionalizing material to the sorbent material (e.g., surface functionalization). For instance, functionalizing material particles can be spray coated, electrolytically coat, dip coated, and/or can otherwise be coated on the sorbent material. Additionally or alternatively to adding a functionalizing material, the sorbent material can be functionalized (e.g., activated) using a non-chemical treatment. In examples, the sorbent material can be: treated with steam and/or a high temperature (e.g., carbonization), activated via activation/oxidation (e.g., heating in oxidizing environment), and/or otherwise functionalized. In a specific example, applying the functionalizing material to the sorbent material can optionally including heating during application to open more microscopic pores of the sorbent material.

In a first variant, S200 is performed prior to S100. S100 is performed using the functionalized sorbent material (e.g., activated carbon) produced at S200.

In a second variant, S200 is performed after the sorbent material is added to the solvent (e.g., during S100). The functionalizing material can also be added to the solvent and mixed with the sorbent material. The precursor can be added to the resulting mixture.

In a third variant, S200 is performed during S100. The sorbent material, functionalizing material, and precursor are all added to the solvent and mixed to form a mixture (e.g., a slurry, a solution, etc.).

In a fourth variant, S200 can be performed contemporaneously with S300. For instance, in S100, a functionalizing material precursor can be mixed with the sorbent material and the antibiological precursor. The functionalizing material precursor can then be converted to the functionalizing material in a manner analogous to that which converts the antibiological precursor to antibiological material.

However, functionalizing the sorbent material S200 can be otherwise performed.

5.3 Forming the Antibiological Material from the Precursor S300.

Forming the antibiological material S300 from the antibiological precursor can function to generate the antibiological material (e.g., antimicrobial material, antimicrobial nanoparticles, etc.). The antibiological material is preferably formed from the mixture of S100, but can be formed from any suitable mixture. The antibiological material preferably grows on the sorbent material (e.g., at active sites, within the pores, on the exposed surface of the sorbent material, etc.), but can nucleate or grow (e.g., in solution) and disperse on the sorbent material, and/or otherwise be formed. Additionally or alternatively, the antibiological material can be formed independently of the sorbent material, and subsequently deposited on the sorbent material (e.g., using any coating processes described herein).

Forming the antibiological material can include: depositing the precursor or intermediates formed therefrom, oxidizing the precursor or intermediates formed therefrom (e.g., by adding an oxidizing agent such as oxygen, ozone, water, peroxides, halogens, nitric acid, sulfuric acid, hexavalent chromium, nitrogen oxides, etc.), reducing the precursor or intermediates formed therefrom (by adding a reducing agent such as lithium aluminium hydride, sodium borohydride, hydrogen, hydrazine, diborane, sulfur dioxide, oxalic acid, formic acid, ascorbic acid, etc.), decomposing the precursor or intermediates formed therefrom, solubilizing or dissolving the precursor or intermediates formed therefrom, and/or any suitable steps or processes. When one or more species (e.g., oxidizing agents, reducing agents, etc.) is added during formation of the antibiological material, the species can be added quickly (e.g., poured in, dropped in, injected, added in one or other small number of additions, etc.) or slowly (e.g., dropwise addition, by syringe pump, by addition funnel, etc.).

Properties of the antibiological material (such as the characteristic size, morphology, structure, size distribution, composition, sorption capacity, etc.) can be controlled and/or modified based on the formation temperature, rate of species addition, amount of species, duration of formation, and/or based on any suitable properties of the reaction(s).

Forming the antibiological material S300 can optionally include reducing the precursor S301 and oxidizing the precursor S302.

Reducing the precursor S301 can function to reduce (e.g., add electrons to) the precursor which can optionally solubilize the precursor (e.g., form soluble ions of the precursor), nucleate particle formation from the precursor (by decreasing a solubility of the precursor such as forming a neutral metal atoms), and/or can otherwise function.

Reducing the precursor can be performed by adding one or more reducing agents to the precursor (e.g., to the mixture of sorbent material and precursor; to a mixture of sorbent material, precursor, and functionalizing material; etc.). Preferably the reducing agent, when oxidized (e.g., at standard temperature and pressure, at a reducing temperature and/or reducing pressure, etc.), forms (e.g., only forms, essentially only forms, etc.) water and/or gaseous byproducts (e.g., nitrogen gas) and does not leave insoluble and/or soluble byproducts, which can be beneficial because it minimizes and/or entirely eliminates a step of washing the product formed at S300 (e.g., reducing energy or materials consumed to post-process the formed material). However, the reducing agent can additionally or alternatively form insoluble and/or soluble byproducts.

The amount of reducing agent used (e.g., mass, volume, concentration etc.) is preferably sufficient to drive a reduction to completion (e.g., includes an excess of reducing agent to ensure that the precursor is fully reduced, has a stoichiometric amount that matches a stoichiometric amount of precursor(s), etc.). However, the amount of reducing agent can be less than required to complete the reduction reaction (e.g., to partially reduce the precursor).

The reducing agent is preferably an azane (e.g., $N_2H_4$, $N_3H_5$, $N_4H_6$, $N_5H_7$, $N_6H_8$, $N_7H_9$, $N_8H_{10}$, etc.; hydrates thereof; organic molecules derived therefrom; etc.). For example, hydrazine ($N_2H_4$ or a hydrate thereof such as hydrazine hydrate $N_2H_4 \cdot xH_2O$, hydrazine monohydrate $N_2H_4 \cdot H_2O$, etc.) can be used, providing 4 electrons per molecule available for reducing the precursor(s). The reducing agent can additionally or alternatively include sodium borohydride ($NaBH_4$), Lithium aluminium hydride (Li-$AlH_4$), azides (e.g., ammonium azide, hydrazoic acid, etc.), hydrides (e.g., lithium hydride, sodium hydride, etc.), azenes (e.g., $N_2H_2$, $N_3H_3$, $N_4H_4$, etc.; hydrates thereof; organic molecules derived therefrom; etc.), phosphanes (e.g., $P_2H_4$, $P_3H_5$, $P_4H_6$, $P_5H_7$, $P_6H_8$, $P_7H_9$, $P_8H_{10}$, etc.; hydrates thereof; organic molecules derived therefrom; etc.), phosphenes (e.g., $P_2H_2$, $P_3H_3$, $P_4H_4$, etc.; hydrates thereof; organic molecules derived therefrom; etc.), arsanes (e.g., $As_2H_4$, $As_3H_5$, $As_4H_6$, $As_5H_7$, $As_6H_8$, $As_7H_9$, $As_8H_{10}$, etc.; hydrates thereof; organic molecules derived therefrom; etc.), arsenes (e.g., $As_2H_2$, $As_3H_3$, $As_4H_4$, etc.; hydrates thereof; organic molecules derived therefrom; etc.), stibanes (e.g., $Sn_2H_4$, $Sn_3H_5$, $Sn_4H_6$, $Sn_5H_7$, $Sn_6H_8$, $Sn_7H_9$, $Sn_8H_{10}$, etc.; hydrates thereof; organic molecules derived therefrom; etc.), stibenes (e.g., $Sn_2H_2$, $Sn_3H_3$, $Sn_4H_4$, etc.; hydrates thereof; organic molecules derived therefrom; etc.), bismuthanes (e.g., $Bi_2H_4$, $Bi_3H_5$, $Bi_4H_6$, $Bi_5H_7$, $Bi_6H_8$, $Bi_7H_9$, $Bi_8H_{10}$, etc.; hydrates thereof; organic molecules derived therefrom; etc.), bismuthenes (e.g., $Bi_2H_2$, $Bi_3H_3$, $Bi_4H_4$, etc.; hydrates thereof; organic molecules derived therefrom; etc.), pentazole ($HN_5$), and/or any other suitable reducing agent.

Reducing the precursor can include adding the reducing agent, stirring the resulting mixture, heating the resulting mixture, and/or otherwise reducing the precursor. In examples, the mixture can be made acidic (e.g., pH<7) to make reducing the precursor more efficient (e.g., by speeding up the rection kinetics) and/or otherwise affect the reduction reaction. Acidifying the mixture can be performed by sparging the mixture with an acidic gas (e.g., $CO_2$, HCl, HBr, HI, $HNO_3$, $H_2SO_4$, etc.), and/or otherwise be performed.

When dissolved material (e.g., cations) is reduced, the reduction preferably results in particle formation on the sorbent material surface (which can be beneficial for conferring adhesion of the antibiological material to the sorbent material without the use of binders, capping agents, etc.). However, the reduction can result in formation of particles in solution that can then deposit on or in the sorbent material and/or can otherwise result in coating the sorbent material with reduced precursor.

In a first example, the precursor includes a selenium precursor (e.g., selenium powder, selenium metal, a solid, etc.). Prior to reducing the selenium precursor, the selenium precursor has a large particle size relative to the pores (e.g., nanopores, micropores, mesopores, etc.) of the sorbent material (e.g., characteristic particle size greater than 50 nm, 80 nm, 100 nm, 250 nm, 500 nm, 1 μm, 2 μm, 5 μm, 10 μm, 20 μm, 50 μm, etc.), and is substantially unable to enter the pores of the sorbent material (e.g., can cover the pore but cannot enter the pore volume, can only penetrate a small distance into the pore volume, etc.). The reducing agent reduces the selenium precursor into selenium anions (e.g., $Se^{2-}$), which are soluble in the solvent (e.g., water). After dissolution, the $Se^{2-}$ anions can enter the pore volume of the sorbent material (e.g., with the solvent). Optionally, reducing the selenium precursor can be enhanced (e.g., sped up, more complete, etc.) by acidifying the mixture (e.g., by sparging the solvent and/or mixture with an acidic gas such as $CO_2$).

In a second example, the precursor includes copper nitrate ($Cu(NO_3)_2$), which dissolves in aqueous solution to form copper ions (e.g., $Cu^{2+}$). Prior to reducing the precursor, the $Cu^{2+}$ ions are dissolved in the solution and thereby can enter a pore volume of the sorbent material (in concert with the solvent). After reducing the precursor, the copper ions are reduced to copper metal (i.e., $Cu^0$). The $Cu^0$ forms a particle (e.g., nucleating particle) on the sorbent material, where a size of the particle is controlled (e.g., to achieve a target size, where the target size of the copper particle is substantially the same as the final particle size for the antibiological material except accounting for differences in bond length, lattice size, etc. differences between copper and copper oxide) by a local concentration of copper ions during reduction, a pore size (e.g., physically hindering extended growth of the particle beyond a target size), local gas evolution or bubble formation, copper ion concentration gradient, and/or can otherwise be controlled.

In a third example, multiple precursors can be reduced. Precursors can be reduced contemporaneously, simultaneously, sequentially, and/or in any other suitable order. In a specific example, both $Se^0$ (e.g., from the first specific example) and $Cu^{2+}$ (e.g., from the second specific example) are reduced.

However, reducing the precursor S301 can be otherwise performed.

Oxidizing the precursor S302 can function to oxidize (e.g., remove electrons from) the precursor(s) or intermediates derived therefrom (e.g., reduced precursor(s)) to form (e.g., nucleate, precipitate, generate, etc.) particles from the precursor, stabilize the precursor and/or particles, impart favorable properties to the precursor and/or particles, and/or can otherwise function. Oxidizing the precursor S302 is preferably performed after reducing the precursor S301. However, in some variants, a precursor can be oxidized prior to reduction and/or reduction and oxidation can be performed simultaneously (e.g., by controlling local concentrations or gradients of reducing agents and oxidizing agent).

In variants, oxidizing the precursor (e.g., an oxidation reaction) can be performed by adding an oxidizing agent (e.g., pouring into the mixture, mixing into the mixture, sparging the mixture with oxidizing agent, etc.), by exposing the mixture to atmosphere, and/or otherwise performed. In variants, oxidizing agents can include oxygen, polyoxidanes (e.g., hydrogen polyoxides such as hydrogen peroxide, hydrogen trioxide, hydrogen tetraoxide, hydrogen pentaoxide, etc.), ozone (and/or ozonides), nitrogen oxide (e.g., nitrous oxide, nitric oxide, nitrogen dioxide, dinitrogen tetraoxide, nitrogen trioxide, dinitrogen trioxide, dinitrogen pentoxide, etc.) sulfuric acid, nitric acid, and/or any other suitable oxidizing agent (e.g., halogens such as fluorine, chlorine, etc.; nitrate compounds such as potassium nitrate; potassium chlorate; peroxydisulfuric acid; peroxymonosulfuric acid; halogen oxyanions such as hypochlorite, chlorite, chlorate, perchlorate, etc.; fluorides such as fluorides of chlorine, bromine, iodine, etc.; hexavalent chromium compounds such as chromic acids, dichromic acids, chromium trioxide, pyridinium chlorochromate, etc.; permanganate compounds such as potassium permanganate; sodium perborate; sodium bismuthate; lead dioxide; cerium compounds such as ceric ammonium nitrate, ceric sulfate, etc.; etc.). The oxidation reaction can proceed over an oxidation time (e.g., 1 minute, 5 minutes, 10 minutes, 20 minutes, 30 minutes, 1 hour, 2 hours, 4 hours, etc.). In a specific example, oxidizing can include adding the oxidizing agent and/or oxygen gas to the mixture for an oxidation time, and subsequently exposing the mixture to atmosphere.

The amount of oxidizing agent used (e.g., mass, volume, concentration etc.) can be sufficient to drive an oxidation to completion (e.g., includes an excess of oxidizing agent to ensure that the precursor is fully oxidized, has a stoichiometric amount that matches a stoichiometric amount of precursor(s), etc.), can be less than required to complete the oxidation reaction (e.g., to partially oxidize the precursor such as to form a mixture of oxidation states of the precursor or intermediates derived therefrom), and/or can include any suitable amount of oxidizing agent. As an illustrative example, the amount of oxidizing agent added can be selected to produce a mixture of $Cu^+$ and $Cu^{2+}$ (preferably with substantially no remaining $Cu^0$) in the antibiological material.

The material resulting from the oxidation reaction can be an antibiological sorbent, such as sorbent material that includes antibiological material (e.g., particles of the antibiological material). Preferably, the oxidization reaction produces a plurality of nanoparticles (e.g., as described above) dispersed on the environment facing surfaces (including within the pore volume) of the sorbent material. In specific examples, oxidizing the precursor can oxidize $Se^{2-}$ to $Se^0$ (e.g., elemental selenium, selenium nanoparticles, etc.), copper metal (e.g., copper particles) to copper oxide (e.g., copper oxide nanoparticles), and/or any other suitable reaction. In specific examples, the antibiological sorbent formed includes coated carbon particles including antibiological nanoparticles dispersed on a surface of the porous carbon particles.

When dissolved material (e.g., anions) is oxidized, the oxidation preferably results in particle formation on the sorbent material surface (which can be beneficial for conferring adhesion of the antibiological material to the sorbent material without the use of binders, capping agents, etc.). However, the oxidation can result in formation of particles in solution that can then deposit on or in the sorbent material and/or can otherwise result in coating the sorbent material with oxidized precursor (e.g., antibiological material).

However, oxidizing the precursor S302 can be otherwise performed.

Figures 4A, 4B:
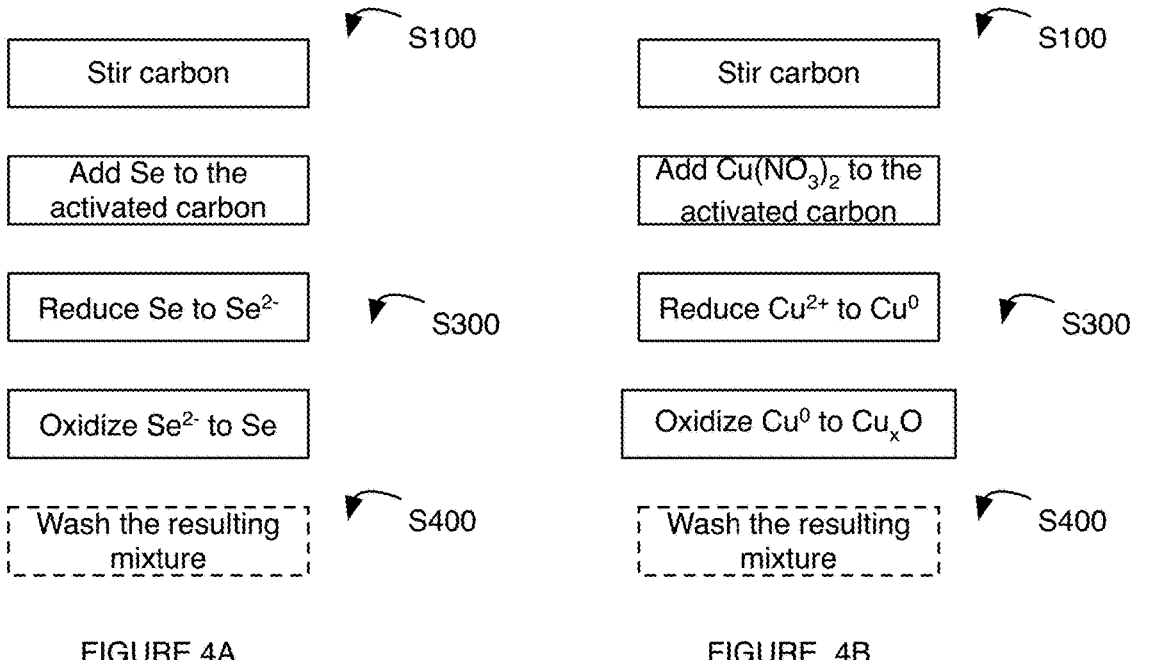
FIG. 4A is a schematic representation of an example of manufacturing a porous carbon material including selenium.
FIG. 4B is a schematic representation of an example of manufacturing a porous carbon material including copper.
Figure 12B:
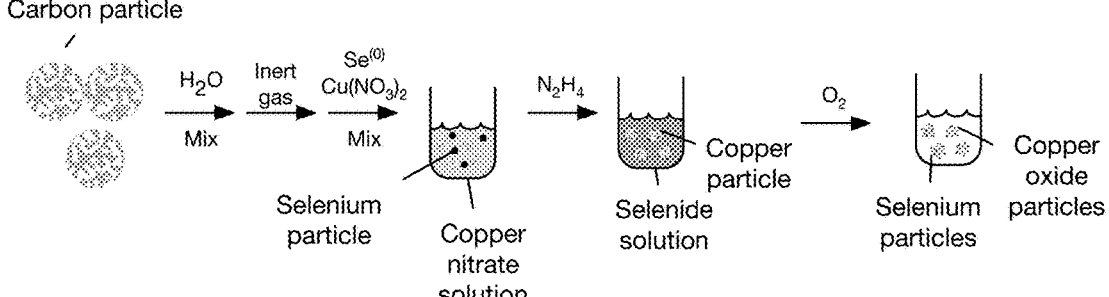
Figure 12C:
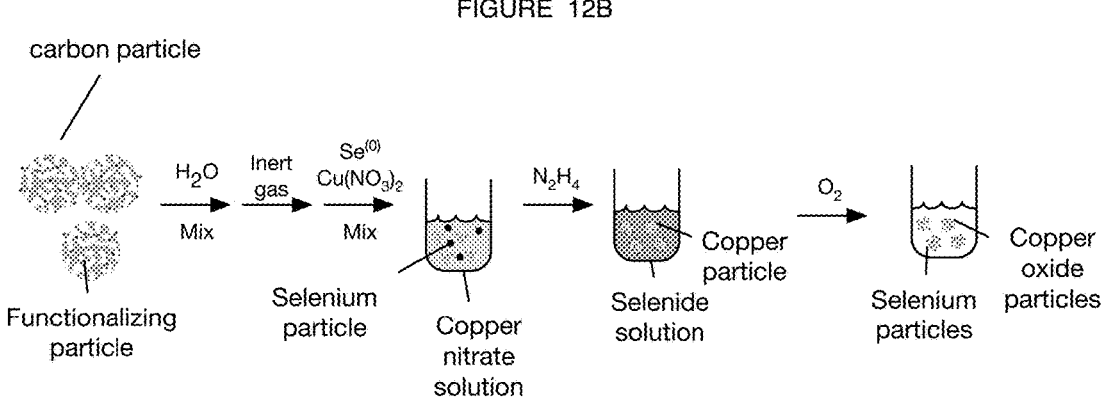

In a first specific example as shown in FIG. 4A, forming the antibiological material can include: reducing selenium (e.g., selenium powder) to $Se^{2-}$ (e.g., using hydrazine hydrate) which can function to solubilize and/or disperse the selenium atoms, stirring the resulting carbon and $Se^{2-}$ mixture for a predetermined amount of time (e.g., 1 minute, 5 minutes, 10 minutes, 20 minutes, 30 minutes, 1 hour, 2 hours, 4 hours, etc.), and oxidizing the $Se^{2-}$ to $Se^0$. The resulting material can be a carbon material that includes elemental selenium (e.g., selenium particles, selenium coating). In some variations, oxidizing the $Se^{2-}$ can include introducing oxygen to the mixture for a predetermined amount of time and then exposing the solution to atmosphere, where the elemental selenium is within (but preferably not blocking or fully obstructing) the pores of the carbon. In a second specific example, shown in FIG. 4B, copper nitrate can be reduced to form copper metal and/or decomposed to form copper oxide (e.g., where copper nitrate can be included in addition to or as an alternative to the selenium). In a variation of this specific example, the copper nitrate can be added before reducing selenium, during selenium reduction, after selenium reduction (e.g., before oxidation of the selenium ions), after selenium oxidation (e.g., to be decomposed in another step), and/or with any suitable timing. The resulting material from these variations can be carbon including copper oxide and, optionally, elemental selenium (e.g., selenium particles, selenium coating). For instance, as shown in FIG. 12B and FIG. 12C, selenium powder and copper oxide can be added to an inert mixture of water and carbon (e.g., un-functionalized carbon as shown in FIG. 12B, functionalized carbon as shown in FIG. 12C, etc.), mixed to form a copper nitrate solution with selenium particles dispersed therein, hydrazine can be added to the resulting mixture to form a selenide solution containing carbon coated in copper particles, and oxygen can be added to produce carbon coated in both selenium and copper particles.

Optionally, S300 can include forming two or more antibiological materials. In a first variant, forming two or more antibiological materials can include performing S301 and S302 for multiple precursors simultaneously. This variant can include mixing multiple precursors with the sorbent material in a mixture, adding one or more reducing agents to the mixture (e.g., a reducing agent common to multiple precursors), and oxidizing the resulting mixture. In a second variant, forming two or more antibiological materials can include mixing the first precursor with the sorbent material, reducing the first precursor, oxidizing the first precursor, optionally recreating an inert atmosphere, adding a second precursor, reducing the second precursor, then oxidizing the second precursor. In a third variant, forming two or more antibiological materials can include mixing the first precursor with the sorbent material, reducing the first precursor, mixing in the second precursor, reducing the second precursor, then oxidizing the first and the second precursor simultaneously. Steps of each variant can be repeated for additional precursors. However, forming multiple antibiological materials can be performed in any other suitable order.

However, forming the antibiological material can be otherwise performed.

5.4 Post-Processing the Resulting Material S400.

The method can optionally include post-processing the resulting material S400, which can function to remove impurities, byproducts, unreacted species, and/or other components from the resulting material (e.g., antibiological sorbent, sorbent material, antibiological material, material formed in S300, etc.). S400 can additionally or alternatively function to form or modify another product, and/or perform any other suitable function. Post-processing the resulting material S400 can include washing the resulting material, drying the resulting material, heating the resulting material, applying the resulting material to a surface, making a product from the resulting material, regenerating the resulting material, annealing the resulting material, and/or any other suitable processes.

In some variants, S400 can include washing the resulting material. Additionally or alternatively, the resulting material can be formed to have only gaseous byproducts (e.g., after reducing and/or oxidizing), and not require washing. The resulting material can be washed using any suitable solvent (e.g., water, ethanol, isopropyl alcohol, acetone, ether, ethyl acetate, hexanes, etc.). The resulting material can be washed once or a plurality of times (e.g., using the same solvent, using solvents with different polarities, etc.). The resulting material can be collected by centrifuging the wash solution (e.g., to form a pellet of resulting material), decanting the wash solution, evaporating the solvent, using a filter, and/or in any manner.

In some variants, S400 can include drying the resulting material, which can function to remove residual solvent and/or other volatile species (e.g., sorbed by the sorbent or other resulting materials, present as a hydrate or other mineral inclusion, etc.). Drying the resulting material can be performed after washing the resulting material, before washing the resulting material, or without washing the resulting material. The resulting material can be dried under vacuum, at an elevated temperature (which can additionally or alternatively anneal the resulting material), using a dry gas or dry environment (e.g., dehumidification chamber), and/or in any suitable manner. For example, the resulting material can be dried by heating the material to a drying temperature (e.g., 100° C., 200° C., 250° C., 300° C., 500° C., etc.) for a drying time (e.g., 1 minute, 5 minutes, 10 minutes, 20 minutes, 30 minutes, 1 hour, 2 hours, 4 hours, etc.).

In some variants, S400 can include heating the resulting material. Heating the resulting material can optionally function to rejuvenate the antibiological sorbent and/or components thereof (e.g., carbon, sorbent material) in the case that the solvent includes an organic solvent. In variants, the antibiological sorbent can be heated to temperatures between e.g., 800-900° C.

In some variants, S400 can include applying the resulting material (e.g., antibiological sorbent, material formed in S300, material washed in S400, etc.) to a surface. The antibiological sorbent can preferably be applied to the surface without using an adhesive, but can alternatively be applied to the surface using an adhesive (e.g., a binder such as an inorganic binder as disclosed in U.S. patent application Ser. No. 18/132,089 titled 'FILTER MEDIA AND SYSTEM AND METHOD FOR MANUFACTURE THEREOF' filed 7 Apr. 2023 which is incorporated in its entirety by this reference, an organic binder, etc.), via drop casting, via doctor blading, via spin coating, using chemical solution deposition techniques, and/or in any suitable manner. Examples of surfaces include fibrous surfaces (e.g., of a as disclosed in U.S. patent application Ser. No. 18/104,716 titled 'FLUID FILTRATION SYSTEM AND METHOD OF USE' filed 1 Feb. 2023 which is incorporated in its entirety by this reference), substrates, metallic surfaces, countertop, benchtop, solid surface, porous surface, and/or any suitable surface.

In some variants, S400 can include making a product from the resulting material, which can function to produce an antibiological product. Products that can be made from the resulting material can include: a filter (e.g., an air filter, a water filter, a fluid filter, a prefilter, etc.), a fluid filtration system, a ventilation system, an HVAC system, a vacuum, an activated carbon (e.g., wherein the antibiological sorbent is subsequently activated), a carbon bed, a coating, antibiological sorbent pellets, and/or any other suitable product.

In some variants, S400 can include regenerating the antibiological sorbent, which can function to restore the antibiological sorbent and/or constituent elements thereof (e.g., the sorbent material, the antibiological material, the functionalizing material, etc.) to its original state (or to a near original state) by removing accumulated contaminants or byproducts that have been sorbed onto its surface, to reactivate the antibiological sorbent, and/or otherwise function. In examples, the original state can be the state after S300, a state after other post-processing steps (e.g., washing, drying, applying to a surface, forming a product, etc.), a state after performing S200, and/or any other suitable state. Regenerating the antibiological sorbent can include thermal methods (e.g., heating between 800-900° C., heating in an inert atmosphere, heating in a reducing environment, etc.), electrochemical methods, chemical methods (e.g., washing in an acidic or alkaline solution), oxidative methods, reducing the antibiological material (e.g., reducing CuO to Cu$_2$O), and/or any other suitable methods or combination thereof. However, in variants the antibiological sorbent can function without requiring regeneration.

However, post-processing the resulting material S400 can include any other suitable processes.

Figure 6:
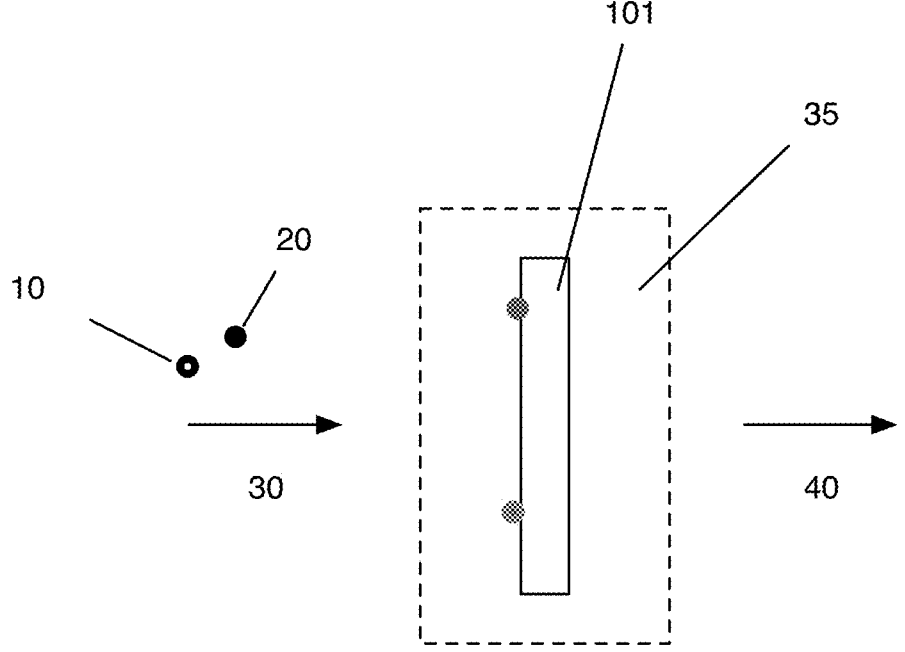
FIG. 6 is a schematic representation of an example of removing a contaminant from a fluid (e.g., air, liquid, gas, etc.) using the antibiological sorbent.

In variants, the method can include neutralizing (e.g., deactivating, killing, sorbing, etc.) at least one of a volatile organic compound (VOC) 20 or a biological species using the antibiological sorbent (e.g., coated carbon) produced by the method (e.g., in steps S100-S400). In examples, the antibiological sorbent can be integrated into a filter and function to convert a contaminant laden fluid (e.g., air, water, etc.) flow 30 into a purified fluid flow 40. An example is shown in FIG. 6. In an example, the method can include neutralizing a contaminant (e.g., a VOC 20, a biological species 10, etc.) using a filter made from the antibiological sorbent.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   a. forming a slurry comprising porous carbon particles, a solvent, and an antibiological precursor;
   b. reducing the antibiological precursor to form a reduced antibiological precursor by adding a reducing agent to the slurry, wherein the only byproducts from oxidation of the reducing agent are water or gas-phase at standard temperature and pressure;
   c. after the antibiological precursor has been reduced, adding an oxidizing agent to the slurry to form coated carbon particles comprising antibiological nanoparticles dispersed on a surface of the porous carbon particles, wherein the oxidizing agent oxidizes the reduced antibiological precursor to form the antibiological nanoparticles;
   wherein the antibiological precursor comprises selenium powder and the antibiological nanoparticles comprise selenium nanoparticles, wherein the reducing agent reduces the selenium powder into selenium anions, wherein the oxidizing agent oxidizes the selenium anions into the selenium nanoparticles.

2. The method of claim 1, wherein a sorption capacity of the coated carbon particles is substantially the same as the sorption capacity of the porous carbon particles.

3. The method of claim 1, further comprising sparging the slurry with carbon dioxide gas prior to adding the reducing agent.

4. The method of claim 1, further comprising functionalizing the porous carbon particles with a material that increases a VOC sorption capacity of the porous carbon particles.

5. The method of claim 4, wherein functionalizing the porous carbon particles does not substantially change an antibiological property of the coated carbon particles.

6. The method of claim 1, wherein the antibiological precursor further comprises copper nitrate and the antibiological nanoparticles further comprise copper oxide nanoparticles, wherein the reducing agent reduces the copper nitrate into copper nanoparticles, wherein the oxidizing agent oxidizes the copper nanoparticles into the copper oxide nanoparticles.

7. The method of claim 6, wherein the copper oxide nanoparticles comprise a mixture of copper (I) oxide and copper (II) oxide.

8. The method of claim 1, wherein the reducing agent comprises hydrazine hydrate.

9. The method of claim 1, wherein the antibiological nanoparticles comprise porous and nonporous nanoparticles.

10. The method of claim 1, wherein the porous carbon particles comprise activated carbon.

* * * * *